(12) United States Patent
Hennick et al.

(10) Patent No.: US 9,235,741 B2
(45) Date of Patent: *Jan. 12, 2016

(54) INDICIA READING TERMINALS AND METHODS EMPLOYING LIGHT FIELD IMAGING

(71) Applicant: Hand Held Products, Inc., Fort Mill, SC (US)

(72) Inventors: Robert J. Hennick, Auburn, NY (US); William H. Havens, Syracuse, NY (US); Timothy Meier, Camillus, NY (US); Scott McCloskey, Minneapolis, MN (US); Donald Anderson, Locke, NY (US); Ynjiun P. Wang, Cupertino, CA (US); Robert M. Hussey, Waxhaw, MT (US); Erik Van Horn, Ocean View, CA (US); Sean P. Kearney, Marlton, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/637,466

(22) Filed: Mar. 4, 2015

(65) Prior Publication Data

US 2015/0178536 A1 Jun. 25, 2015

Related U.S. Application Data

(63) Continuation of application No. 13/781,161, filed on Feb. 28, 2013, now Pat. No. 8,978,984.

(51) Int. Cl.
*G06K 7/10* (2006.01)
*G06K 7/14* (2006.01)
(Continued)

(52) U.S. Cl.
CPC ............ *G06K 7/10811* (2013.01); *G01B 11/02* (2013.01); *G01B 11/22* (2013.01);
(Continued)

(58) Field of Classification Search
CPC ....................................................... G06K 7/00
See application file for complete search history.

(56) References Cited

U.S. PATENT DOCUMENTS

| 3,903,531 A | 9/1975 | Yevick |
| 5,748,371 A | 5/1998 | Cathey, Jr. et al. |

(Continued)

OTHER PUBLICATIONS

Don Clark, "Start-Up Camera in Focus", Wall Street Journal, 1-page, Jun. 22, 2011.
(Continued)

*Primary Examiner* — Christle I Marshall
(74) *Attorney, Agent, or Firm* — Additon, Higgins & Pendleton, P.A.

(57) ABSTRACT

A terminal for decoding decodable indicia includes a plenoptic imaging subsystem comprising an image sensor array and plenoptic imaging optics operable to project a plenoptic image of a space containing the decodable indicia onto the image sensor array, a hand held housing encapsulating a least a portion of the plenoptic imaging subsystem, a trigger for initiating operation of the plenoptic imaging subsystem to obtain plenoptic image data of the decodable indicia, and an illumination source for projecting illumination onto the decodable indicia; an aimer for projecting an aimer pattern onto the decodable indicia. The terminal is operable, responsive to detecting that the trigger has been actuated by an operator, to obtain plenoptic image data from the image sensor array, to obtain first rendered image data based on at least a portion of the plenoptic image data, and to attempt to decode the decodable indicia represented in the rendered image data.

20 Claims, 23 Drawing Sheets

(51) Int. Cl.
 *G01B 11/02* (2006.01)
 *G01B 11/22* (2006.01)
(52) U.S. Cl.
 CPC ........ *G06K7/10732* (2013.01); *G06K 7/10752* (2013.01); *G06K 7/10831* (2013.01); *G06K 7/1439* (2013.01); *G06K 7/1495* (2013.01)

(56) References Cited

U.S. PATENT DOCUMENTS

| | | | |
|---|---|---|---|
| 6,988,663 | B2 | 1/2006 | Krichever et al. |
| 7,014,113 | B1 | 3/2006 | Powell et al. |
| 7,148,923 | B2 | 12/2006 | Harper et al. |
| 7,723,662 | B2 | 5/2010 | Levoy et al. |
| 7,782,365 | B2 | 8/2010 | Levien et al. |
| 7,792,423 | B2 | 9/2010 | Raskar et al. |
| 7,838,814 | B2 | 11/2010 | Minhas et al. |
| 7,909,257 | B2 | 3/2011 | Wang et al. |
| 7,936,392 | B2 | 5/2011 | Ng et al. |
| 7,962,033 | B2 | 6/2011 | Georgiev et al. |
| 8,083,148 | B2 | 12/2011 | Wang et al. |
| 8,231,814 | B2 | 7/2012 | Duparre |
| 8,238,738 | B2 | 8/2012 | Georgiev |
| 8,243,157 | B2 | 8/2012 | Ng et al. |
| 8,248,515 | B2 | 8/2012 | Ng et al. |
| 8,254,034 | B1 | 8/2012 | Shields et al. |
| 8,261,990 | B2 | 9/2012 | Olmstead |
| 8,279,325 | B2 | 10/2012 | Pitts et al. |
| 8,282,006 | B2 | 10/2012 | Longacre, Jr. et al. |
| 8,289,440 | B2 | 10/2012 | Knight et al. |
| 8,290,358 | B1 | 10/2012 | Georgiev |
| 8,305,456 | B1 | 11/2012 | McMahon |
| 8,358,367 | B2 | 1/2013 | Ng et al. |
| 8,602,308 | B2 | 12/2013 | He et al. |
| 8,978,984 | B2 * | 3/2015 | Hennick et al. .......... 235/462.41 |
| 2003/0098910 | A1 | 5/2003 | Kim |
| 2003/0122667 | A1 | 7/2003 | Flynn |
| 2003/0158503 | A1 | 8/2003 | Matsumoto |
| 2004/0263621 | A1 | 12/2004 | Guo et al. |
| 2006/0032915 | A1 | 2/2006 | Schwartz |
| 2006/0202038 | A1 | 9/2006 | Wang et al. |
| 2006/0243798 | A1 | 11/2006 | Kundu et al. |
| 2007/0230944 | A1 | 10/2007 | Georgiev |
| 2008/0007626 | A1 | 1/2008 | Wernersson |
| 2008/0131019 | A1 | 6/2008 | Ng |
| 2008/0187305 | A1 | 8/2008 | Raskar et al. |
| 2009/0160975 | A1 | 6/2009 | Kwan |
| 2010/0265385 | A1 | 10/2010 | Knight et al. |
| 2011/0036910 | A1 | 2/2011 | Bremer et al. |
| 2011/0080487 | A1 | 4/2011 | Venkataraman et al. |
| 2011/0279721 | A1 | 11/2011 | McMahon |
| 2012/0281072 | A1 | 11/2012 | Georgiev et al. |
| 2012/0327222 | A1 | 12/2012 | Ng et al. |
| 2013/0223673 | A1 | 8/2013 | Davis et al. |

OTHER PUBLICATIONS

Ren Ng, "Digital Light Field Photography", A Dissertation Submitted to the Dept. of Computer Science and the Committee on Graduate Studies of Stanford University in Partial Fulfillment of the Requirements for the Degree of Doctor of Philosophy, 203 pages, Jul. 2006.
Camera Technology, One Camera-One Lens-One Shot, Raytrix GmbH, Germany, printout available online on Mar. 3, 2013, at http://raytrix.de/tl.sub.--files/downloads/02.sub.--Raytrix.sub.--Technology.pdf, 36 pages, 2011.
E. H. Adelson and J. Y. A. Wang. Single Lens Stereo with Plenoptic Camera. IEEE Transactions on Pattern Analysis and Machine Intelligence, vol. 14, No. 2. pp. 99-106, Feb. 1992.
Todor Georgiev and Andrew Lumsdaine, Computational Methods for Radiance, printout available online on Mar. 3, 2013, at http://www.tgeorgiev.net/EG10/Computation.pdf, Eurographics 2010, Norrkoping, Sweden, 91 pages, May 4, 2010.
A. Lamsdaine et al., "Full Resolution Lighting Rendering", Adobe Technical Report, Adobe Systems, 12 pages, Jan. 2008.
T. Georgiev et al., "Superresolution with Plenoptic Camera 2.0", Adobe Technical Report, Adobe Systems, 9-pages, Apr. 2008.
M. Prospero,"Never Take an Out-Of-Focus Picture Again: Adobe's New Plenoptic Lens Tech", Laptop—The Pulse of Mobile Tech, printout available online on Jan. 30, 2013, at http://blog.laptopmag.com.never-take-an-out-of-focus picture-again-adobes- -new-photo-technology, 6 pages, Sep. 22, 2010.
T. Georgiev et al., "Focused Plenoptic Camera and Rendering", Journal of Electronic Imaging, vol. 19, Issue 2, 28-pages, Mar. 3, 2010.
S. Shankland, "Photo industry braces for another revolution", CNET News, printout available on-line on Mar. 3, 2013, at http://news.cnet.com/8301-13580.sub.--3-9882019-39/photo-industry-braces-- for-another-revolution/, 5 pages, Mar. 3, 2008.
D. R. Golish et al., "Development of a scalable image formation pipeline for multiscale gigapixel photography", AWARE2 camera, Opt Express vol. 20(20) pp. 22048-22062, Sep. 11, 2012.
Redding et al., "Speckle-Free Laser Imaging with Random Laser Illumination", Optics & Photonics News, 1-page, Dec. 2012.
Marks et al., "Gigapixel Imaging With the AWARE Multiscale Camera", Optics & Photonics News, 1-page, Dec. 2012.
Raytrix Lightfield Camera, One Camera-One Lens-One Shot, Raytrix GmbH, Germany, printout available online on May 22, 2013, at http://www.raytrix.de/tl.sub.--files/downloads/Raytrix.sub.--Slides.pdf, 36 pages, Jun. 7, 2012.
Veerarahgaven et al., "Dappled Photography: Mask Enhanced Cameras for Heterodyned Light Fields and Coded Apeture Refocusing," ACM Transactions on Graphics, vol. 26, No. 3, Article 69, 14-pages, Jul. 2007.
J. G. Purdy, "Pelican Imaging: An Exciting New Paradigm for Mobile Camera Imaging", Inside Mobile Newsletter, printout available online on Mar. 3, 2013, at http://mobiletrax.com/Newsletters/tabid/115/EntryId/198/-Pelican- -Imaging-An-Exciting-New-Paradigm-for-Mobile-Camera-Imaging.aspx, 6 pages, Oct. 31, 2012.
Ng et al., "Light Field Photography with a Hand-Held Plenoptic Camera", Stanford University Computer Science Tech Report CSTR Feb. 2005, 11 pages, 2005.
K. Fatahalian, "Lecture 18: Light Field Cameras. (Plenoptic Cameras)" CMU 15-869: Graphics and Imaging Architectures, 30 pages, Fall 2011.
A. Wilson, "3-D Metrology—Lightfield camera tackles high-speed flow measurements", Vision Systems Design, printout available online Mar. 3, 2012, at http://www.vision-systems.com/articles/print/volume-16/issue-11/- features/lightfield-camera-tackles-high-speed-flow-measurements.html, 4-pages, Nov. 1, 2011.
M. Harris, "Light Field Photography Revolutionizes Imaging", IEEE Spectrum, printout available online on Mar. 3, 2013, at http://spectrum.ieee.org/consumer-electronics/gadgets/lightfield-photography-revolutionizes-imaging/0#, 11-pages, May 2012.
M. B. Griggs, The Lytro Light-Field Camera: How It Works, Popular Mechanics, printout available online Mar. 3, 2013, at http://www.popularmechanics.com/technology/gadgets/reviews/the-lytro-light-filed-camera-how-it-works, 4-pages, Jul. 12, 2011.
A. Agrawal, "Lytro vs. Mask Based Light Field Camera", printout available online on Mar. 3, 2013, http://www.umiacs. umd.edu/aagrawal/sig08/BuildingLightFieldCamera.html, 1 page, Nov. 8, 2011.
O. Malik, "Startup Charts the Future of Camera Phones, ends Megapixel Myth", printout available online on May 22, 2013, http://gigaom.com/2011/02/09/pelican-imaging/, 15-pages, Feb. 9, 2011.
Ren Ng, "Fourier Slice Photography", Stanford University, printout available online on May 22, 2013, at http://graphics.stanford.edu/papers/fourierphoto/fourierphoto-600dpi.pdf, 11 pages, 2005.
Gautam Naik, "Next Cameras Come Into View", Wall Street Journal, printout available online on May 22, 2013, at http://online.wsj.com/article/SB10001424052702304441404577478182111367056-.html#printMode, 4 pages, Jun. 21, 2012.
"What is light field", LightField Forum—Your News Source for all things Light Field, printout available online on Mar. 3, 2013, at http://lightfield-forum.com/what%20-is-the-lightfield/, 3-pages, Feb. 29, 2012.

* cited by examiner

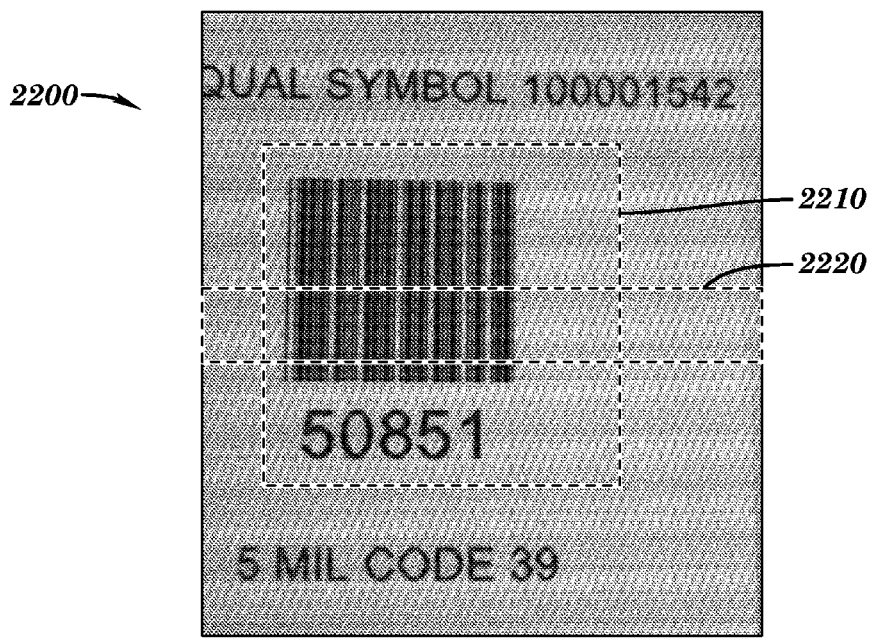
FIG. 17
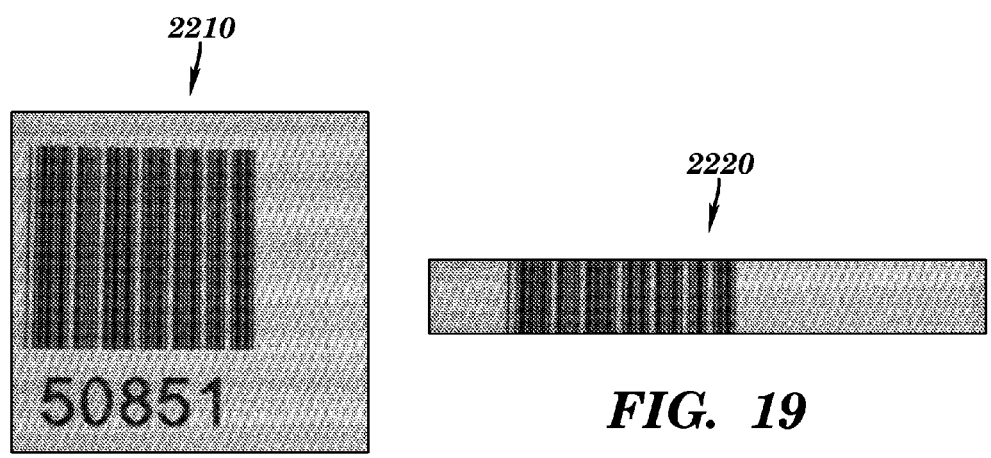
FIG. 18
FIG. 19

INDICIA READING TERMINALS AND METHODS EMPLOYING LIGHT FIELD IMAGING

CROSS-REFERENCE TO RELATED APPLICATION

The present application claims the benefit of U.S. patent application Ser. No. 13/781,161 for *Indicia Reading Terminals and Methods for Decoding Decodable Indicia Employing Light Field Imaging* filed Feb. 28, 2013 (and published Aug. 28, 2014 as U.S. Patent Application Publication No. 2014/0239071), now U.S. Pat. No. 8,978,984. Each of the foregoing patent application, patent publication, and patent is hereby incorporated by reference in its entirety.

FIELD OF THE INVENTION

The present disclosure relates generally to indicia reading terminals, and more specifically, to indicial reading terminals and methods for decoding decodable indicia employing light field imaging.

BACKGROUND

Indicia reading devices, also referred to as scanners, laser scanners, image readers, indicia readers, etc., typically read data represented by printed or displayed information bearing indicia, also referred to as symbols, symbologies, bar codes, etc. Barcodes, such as UPC codes, use thin and thick bar patterns to represent data while more complex coding systems, known as 2D matrix codes, use intricate patterns of blocks and arrangements to store information.

One-dimensional (1D) or linear optical bar code readers are characterized by reading data that is encoded along a single axis, in the presence and/or widths of bars and spaces, so that such symbols can be read from a single scan along that axis.

Two-dimensional (2D) or area optical bar code readers utilize a lens to focus an image of the bar code onto a multiple pixel image sensor array, which often is provided by a CMOS-based or CCD-based image sensor array that converts light signals into electric signals.

In conventional 2D imaging, the output of the 2D imaging hardware is a grid of integer values proportional to the light intensity at each pixel. For example, a point on a barcode that is in sharp focus on the sensor array results from a cone of rays (light rays having different directions) emerging from the point on the barcode, which rays are refracted by the lens, and fall on a single pixel on the sensor array. The light output value of the pixel is equal to the sum of all the rays having different directions falling onto the pixel.

A light field camera, also called a plenoptic camera, is operable to capture additional information regarding light rays having different directions emerging from a scene. One approach includes a microlens array placed in front of the sensor such that a main lens is focused on the microlens array and the microlens array is focused on the sensor array. In the light filed camera, for example, a cone of rays from a focused point in the scene that falls on a microlens of the microlens array diverts the rays to different pixels on the sensor. Another approach employs a mask instead of a microlens array. The additional information allows software algorithms to manipulate the captured image to refocus portions of the image and change the perspective or point of view of the image after the image has been captured by the imaging hardware.

There is a need for further indicia reading terminals, and more specifically, to indicial reading terminals and methods for decoding decodable indicia employing light field imaging.

SUMMARY

One aspect of the present disclosure is directed to an indicia reading terminal for decoding decodable indicia. The indicia reading terminal includes a plenoptic imaging subsystem comprising an image sensor array and plenoptic imaging optics operable to project a plenoptic image of a space containing the decodable indicia onto the image sensor array, a hand held housing encapsulating a least a portion of the plenoptic imaging subsystem, a trigger for initiating operation of the plenoptic imaging subsystem to obtain plenoptic image data of the decodable indicia, and an illumination source for projecting illumination onto the decodable indicia; an aimer for projecting an aimer pattern onto the decodable indicia. The indicia reading terminal is operable, responsive to detecting that the trigger has been actuated by an operator, to obtain plenoptic image data from the image sensor array, to obtain first rendered image data based on at least a portion of the plenoptic image data, and to attempt to decode the decodable indicia represented in the rendered image data.

Another aspect of the present disclosure is directed to a method for decoding decodable indicia. The method includes obtaining a first plenoptic image data corresponding to a space containing the decodable indicia from an image sensor array of a hand held indicia reading terminal in responsive to detecting that a trigger has been actuated by an operator, to obtain plenoptic image data from the image sensor array, obtaining a first rendered image based on at least a portion of the plenoptic image data, and attempting a decode of the decodable indicia represented in the first rendered image.

Another aspect of the present disclosure is directed to an indicia reading terminal for decoding decodable indicia. The indicia reading terminal includes a plenoptic imaging subsystem comprising an image sensor array and plenoptic imaging optics operable to project a first plenoptic image of a space containing the decodable indicia onto the image sensor array, a hand held housing encapsulating a least a portion of the plenoptic imaging subsystem, a trigger for initiating operation of the plenoptic imaging subsystem to obtain plenoptic image data of the decodable indicia, and an illumination source for projecting illumination onto the decodable indicia, an aimer for projecting an aimer pattern onto the decodable indicia. The indicia reading terminal is operable, responsive to detecting that the trigger has been actuated by an operator, to obtain first plenoptic image data from the image sensor array, to adjust at least one operating parameter of the indicia reading terminal based on the first plenoptic image data, to project a second plenoptic image of the space containing the decodable indicia onto the image sensor array, to obtain a first rendered image based on at least a portion of the second plenoptic image data, and to attempt to decode the decodable indicia represented in the first rendered image.

Another aspect of the present disclosure is directed a method for decoding decodable indicia. The method includes obtaining a first plenoptic image data corresponding to a space containing the decodable indicia from an image sensor array of an indicia reading terminal, adjusting at least one operating parameter of the indicia reading terminal based on the first plenoptic image data, obtaining a second plenoptic image data corresponding to the space containing the decodable indicia from the image sensor array of the indicia reading terminal, obtaining a first rendered image based on at least a portion of the second plenoptic image data, and attempting a decode of the decodable indicia represented in the first rendered image.

A terminal for measuring at least one dimension of an object. The terminal includes a plenoptic imaging subsystem comprising an image sensor array and plenoptic imaging optics operable to project a plenoptic image of a space containing the decodable indicia onto the image sensor array, and the terminal is operable to obtain plenoptic image data of the object from the image sensor array, and to determine at least one of a height, a width, and a depth dimension of the object based on at least a portion of the plenoptic image data.

BRIEF DESCRIPTION OF THE DRAWINGS

The subject matter which is regarded as the invention is particularly pointed out and distinctly claimed in the concluding portion of the specification. The disclosure, however, may best be understood by reference to the following detailed description of various embodiments and the accompanying drawings in which:

FIG. 17 is the plenoptic image of the decodable indicia corresponding to FIG. 14;

FIGS. 18 and 19 are partial representations of the read out portions of the plenoptic image of FIG. 17;

DETAILED DESCRIPTION

The present disclosure is generally directed to imaging devices such as optical readers or indicia reading terminals for use in reading decodable indicia in which in various aspects employ obtaining plenoptic image data, light field image data, or 4D (4 dimensional) image data, e.g., operable to record the light field emanating from the space containing the decodable indicia on an imaging surface of an imager sensor array. Such data provides additional information regarding the detected light rays such as information regarding the position and angle of the detected light rays compared to conventional optical readers or indicia reading terminals. In various aspects, the operation of the imaging devices may be configured to operably process or use one or more portions of the plenoptic image data for read out and/or for decoding the representation of the decodable indicia. In other aspects, the use of one or more portions of the plenoptic image data may allow for controlling, tailoring, or optimizing the operation of the imaging devices. In further aspects, the use of one or more portions of the plenoptic image data allow for object dimensioning. As described in greater detail below, the use of plenoptic image data may allow for improved reading of decodable indicia and dimensioning of objects compared to conventional imaging devices. In addition, as explained below such techniques avoid the need for mechanical optical focusing systems.

Figure 1:
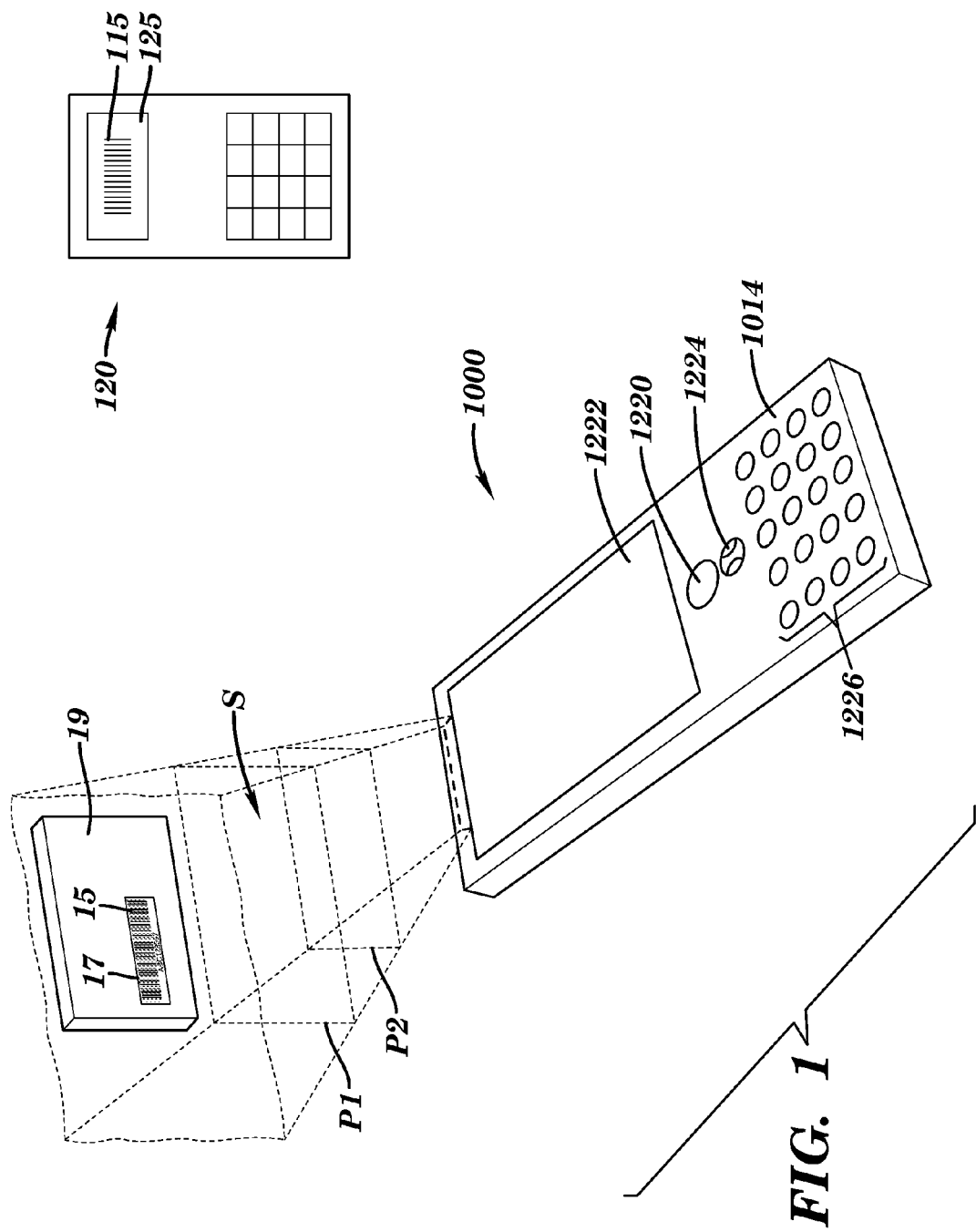
FIG. 1 is a schematic physical form view of one embodiment of an imaging device such as an indicia reading terminal in accordance with aspects of the present disclosure.

FIG. 1 illustrates one embodiment of an imaging device such as an indicia reading terminal 1000 in accordance with aspects of the present disclosure for use in reading decodable indicia. Indicia reading terminal 1000 may be operable for reading decodable indicia such as a barcode 15 disposed on a non-backlit substrate 17 such as paper, e.g., attached to a product 19. The decodable indicia may include but are not limited to:

one dimensional linear symbologies such as Code 3-of-9, I 2-of-5, Code 128, UPC/EAN and the stacked linear codes such as PDF-417, 16K, and Code 49 (often also designated as two dimensional symbologies), in both cases the information is contained with the widths and spacings of the bars and spaces;

true two dimensional matrix codes such as Code 1, Data-Matrix, MaxiCode, QR-Code, and Axtec Code where information is contained in the presence or absence of a mark at predefined locations on a two dimensional coordinate system; and Human readable fonts such as OCR and typed text.

Many of these indicia have normalized definitions that have been developed and recognized by one or more international standards agencies, such as the former AIM and more recently by ISO/IEC.

With reference still to FIG. 1, indicia reading terminal 1000 may also be operable for reading decodable indicia such as a barcode 115 displayed on an electronic device 120 such as a backlit screen 125, e.g., such as a display, monitor, LCD display, or other screen often employed in mobile phones, cell phones, satellite phones, smart phones, telemetric devices, personal data assistants, and other devices. While a single decodable indicia is illustrated as being read at a time, it will be appreciated that an image may be operable to capture one or more decodable indicia on a single object or on a plurality of objects at the same time.

For example, terminal 1000 in one embodiment may include a trigger 1220, a display 1222, a pointer mechanism 1224, and a keyboard 1226 disposed on a common side of a hand held housing 1014. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222.

Figure 3:
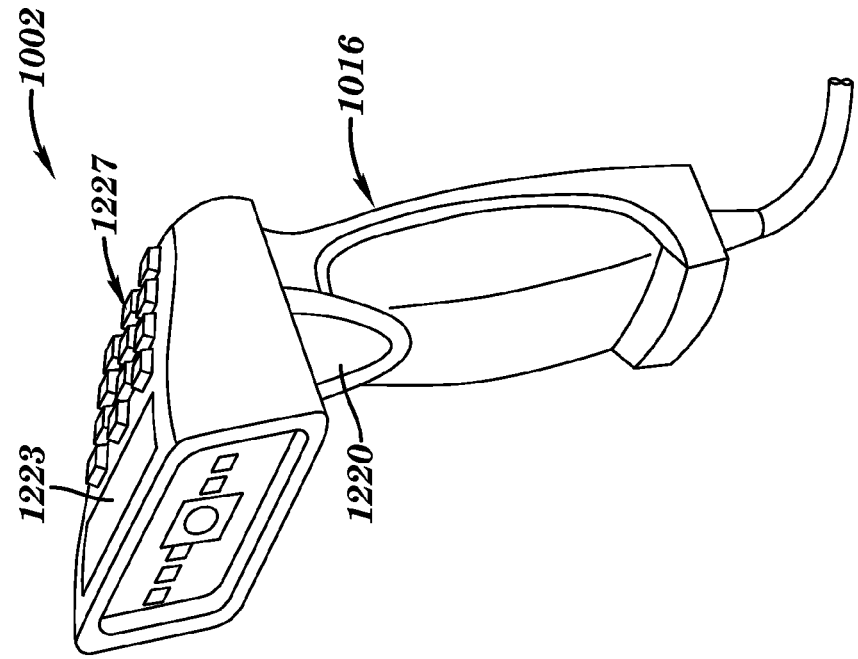
FIGS. 2 and 3 illustrate other types of imaging devices in accordance with aspects of the present disclosure.
Figure 2:
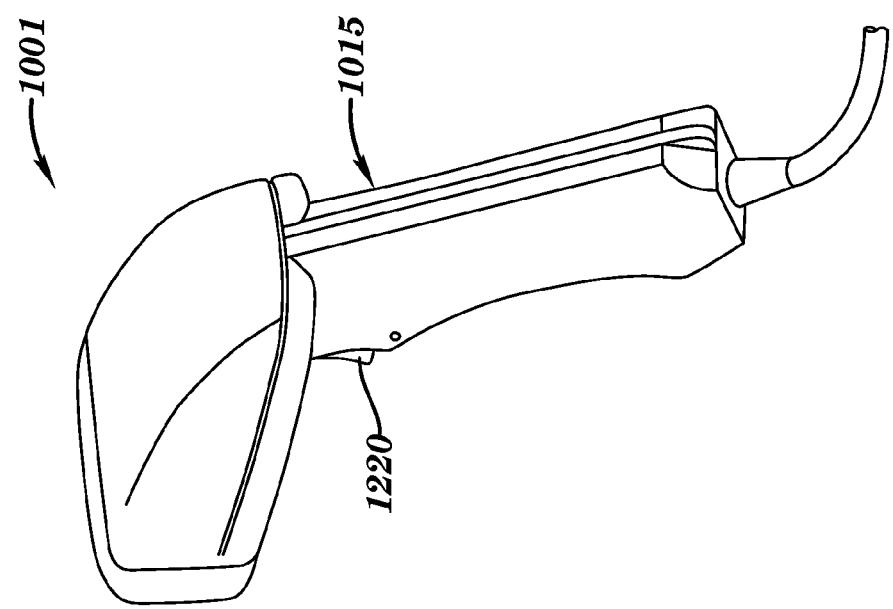

In other embodiments, a hand held housing 1015 of an indicia reading terminal 1001 may be devoid of a display and a keyboard, and may be in a gun style form factor having a trigger 1221 as shown in FIG. 2. In other embodiments, a hand held housing 1016 of an indicia reading terminal 1002 may include a display 1223 and a keyboard 1227, and may be in a gun style form factor having a trigger 1220 such as shown in FIG. 3.

The following description uses nomenclature associated with indicia reading terminals and may generally include hand held indicia reading terminals, fixed indicia reading terminals, however those of ordinary skill in the art will recognize that aspects of the present disclosure may be incorporated in other electronic devices having an imager for image capture and/or indicia reading which may be configured as, for example, mobile phones, cell phones, satellite phones, smart phones, telemetric devices, personal data assistants, cameras, and other devices.

Figure 4:
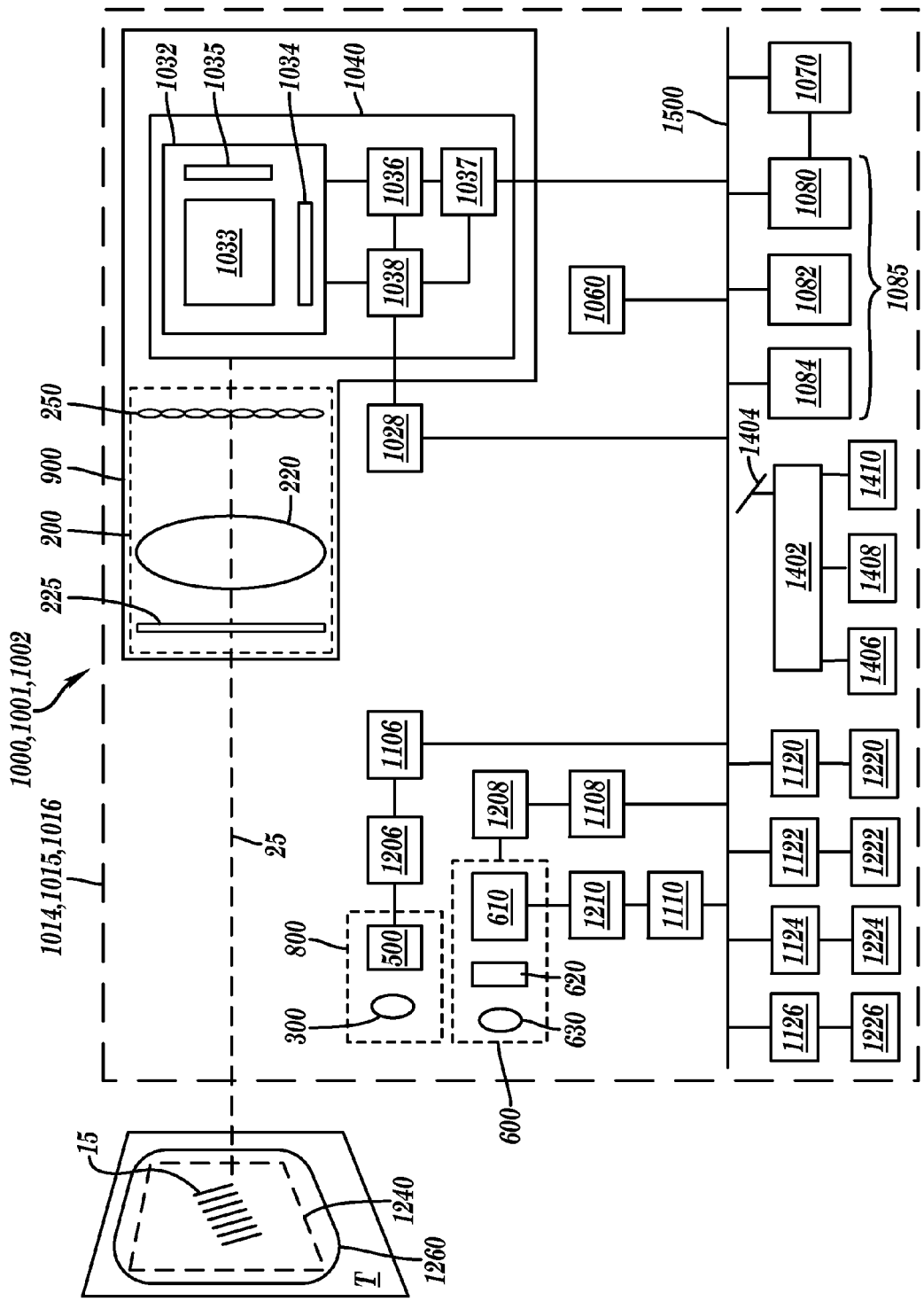
FIG. 4 is a block diagram of one embodiment of the imaging device of FIG. 1.

FIG. 4 depicts a block diagram of one embodiment of indicia reading terminal such as indicia reading terminals 1000, 1001, or 1002. Generally, the indicia reading terminal may include an illumination subsystem 800, an aimer subsystem 600, a plenoptic imaging subsystem 900 comprising a plenoptic imaging optics 200 and an image sensor integrated circuit 1040 having an image sensor array 1033, hand held housing 1014, 1015, or 1016, a memory 1085, and a processor 1060. As described in greater detail below, plenoptic imaging optics 200 allows for capturing the 4D light field information of a scene S (FIG. 1) onto image sensor array 1033. For example, plenoptic imaging optics 200 may comprise a main lens 220 and a microlens array 250. The microlens array may comprise thousands of microlenses and the microlens array may be disposed between the main lens and the image sensor array. Analog signals of the scene or portions thereof that are read out of image sensor array 1033 can be amplified by gain block 1036 converted into digital form by analog-to-digital converter 1037 and sent to DMA unit 1070. DMA unit 1070, in turn, can transfer digitized image data into volatile memory 1080. Processor 1060 can address one or more frames of image data retained in volatile memory 1080 for processing of the frames as described below for indicia decoding. An image captured through plenoptic image optics is referred to as a plenoptic image. Data captured on an image sensor through plenoptic imaging optics is referred to as plenoptic image data.

Conventional 2D Imaging

Figure 5:
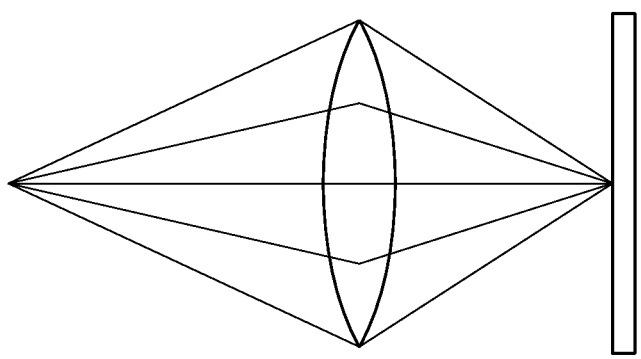
FIG. 5 is a diagrammatic illustration of imaging using a single main lens.

FIG. 5 diagrammatically illustrates a conventional imaging system having a main lens in which a point, e.g., on an object, in focus on an image sensor array results in the angular content of the light rays from the point entering the imaging system being integrated or summed on the image sensor array.

Plenoptic Imaging

Figure 6:
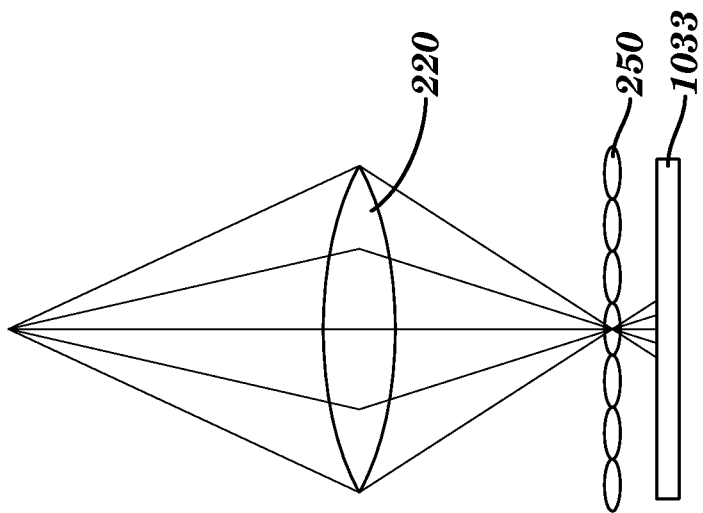
FIG. 6 is a diagrammatic illustration of one embodiment of the plenoptic optics of FIG. 2 comprising a main lens and a microlens array for obtaining a plenoptic image.

FIG. 6 diagrammatically illustrates exemplary plenoptic imaging optics and image sensor array operable for obtaining a plenoptic image for use in the imaging terminal of the present disclosure. The plenoptic imaging optics may include main lens 220 and microlens array 250. Main lens 220 may be optimized to reduce optical aberrations and comprise any of a doublet, triplet, or other multi-element lens assembly. One or more of these elements may be further optimized by giving it an aspheric shape as is known in the art. The microlenses and the gap between the microlenses and imager sensor array 1033, in FIG. 6, are not drawn to scale. For example in a plenoptic imaging optical system, the microlens array in front of the image sensor array may contain anywhere from a few microlenses to hundreds of thousands of microlenses or more. The portion of the image sensor array under each microlens converts the light information which transmits through the microlens into an electrical signal, producing small images. These small images are referred to as microlens images throughout this disclosure.

Plenoptic Imaging and Processing

Figure 7:
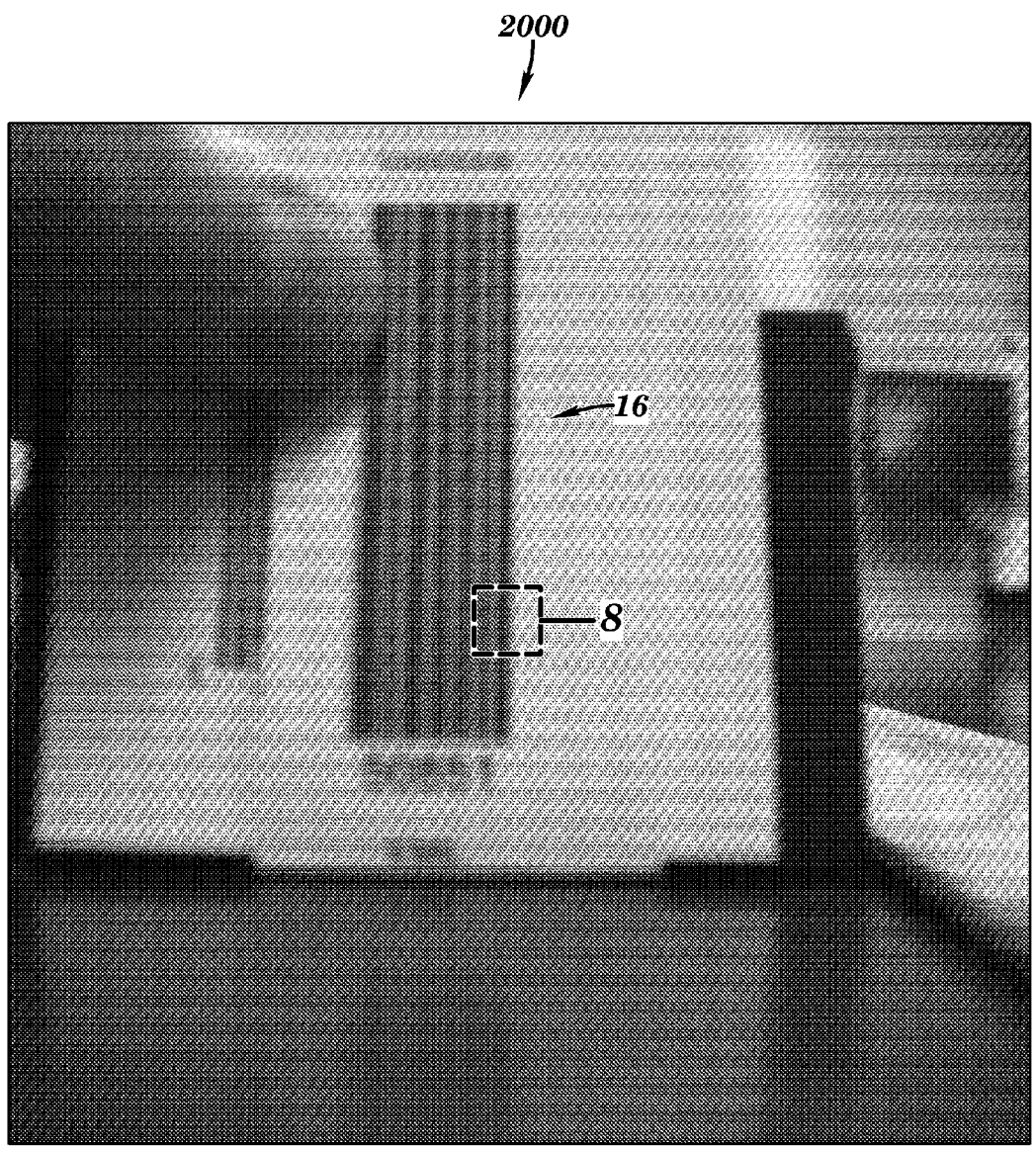
FIG. 7 is a plenoptic image of a decodable indicia obtained using the imaging device of FIG. 1.

FIG. 7 illustrates a plenoptic image 2000 of a barcode 16. The plenoptic image is a source or raw image from the image sensor array which may either be used in this form for controlling the operating parameters of the indicia reading terminal such as for exposure control, motion detection or other operating parameters, or could be used in whole or in part to obtain or create rendered images used for indicia decoding, as described below.

Figure 8:
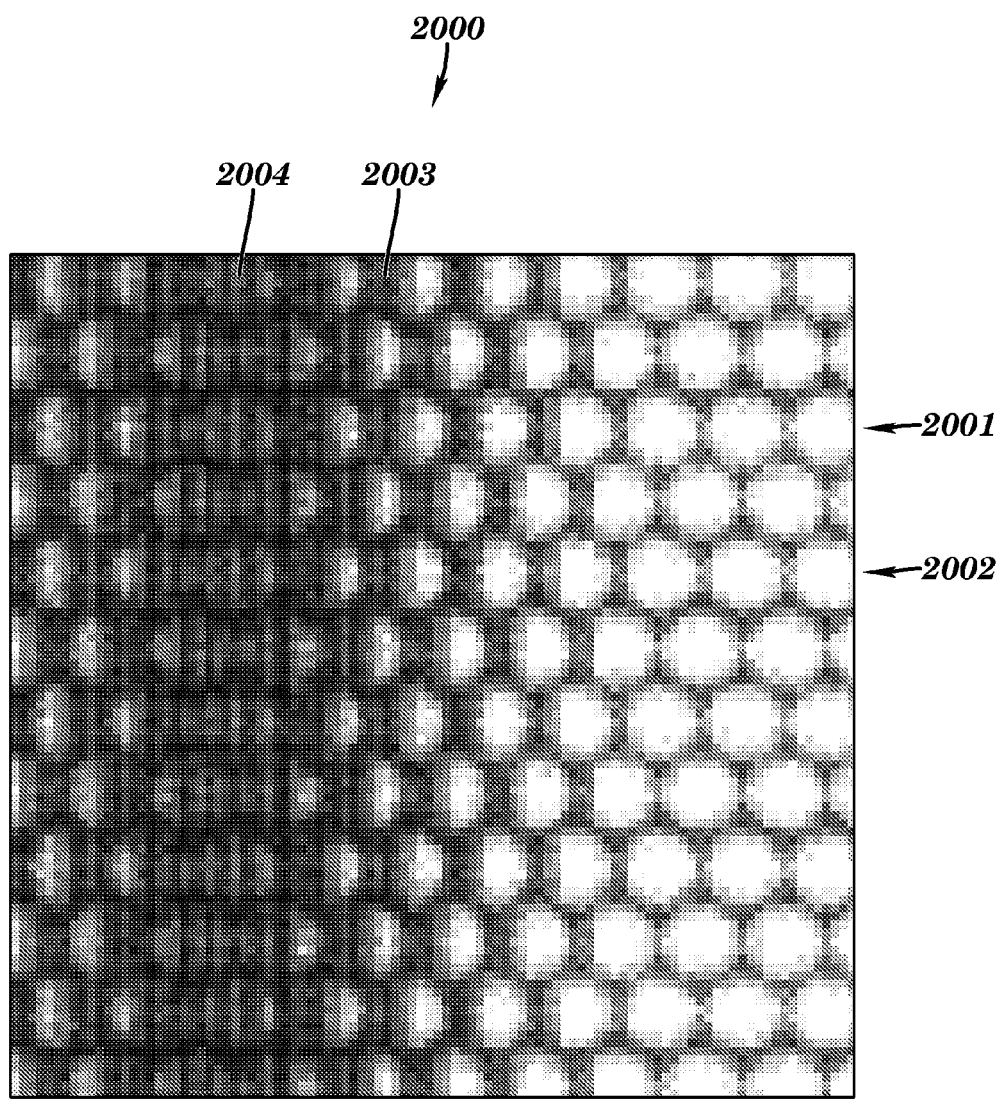
FIG. 8 is an enlarged portion of the plenoptic image of the decodable indicia as shown in Detail 8 of FIG. 7.

Each of the small microlenses of the microlens array covers a group of pixels on the image sensor array to form, as shown in FIG. 8, a plurality of microlens images. For example, as shown in FIG. 8, microlens images 2001 and 2002 do not include any of the black lines of the bar code, while microlens images 2003 and 2004 include portions of a line of the barcode. In this exemplary embodiment, each microlens image may comprise about 81 pixels, e.g., disposed in a 9 by 9 array. However, the microlens images in the plenoptic image may consist of circles or rectangles or other shapes, the microlenses themselves may be arranged in a rectangular pattern, a honeycomb pattern, or other patterns, and the sensor elements covered by a specific microlens may comprise any number of pixels. The more pixels under each microlens, the higher the level of quality (i.e. lower noise, greater definition of detail) will be available in the rendered images allowing, e.g., the ability to re-focus at more depth points due to higher angular resolution.

A rendered image is the conglomeration of the plenoptic image data in such a way that creates a viewable and/or decodable image at a specific focus depth.

Figure 9:
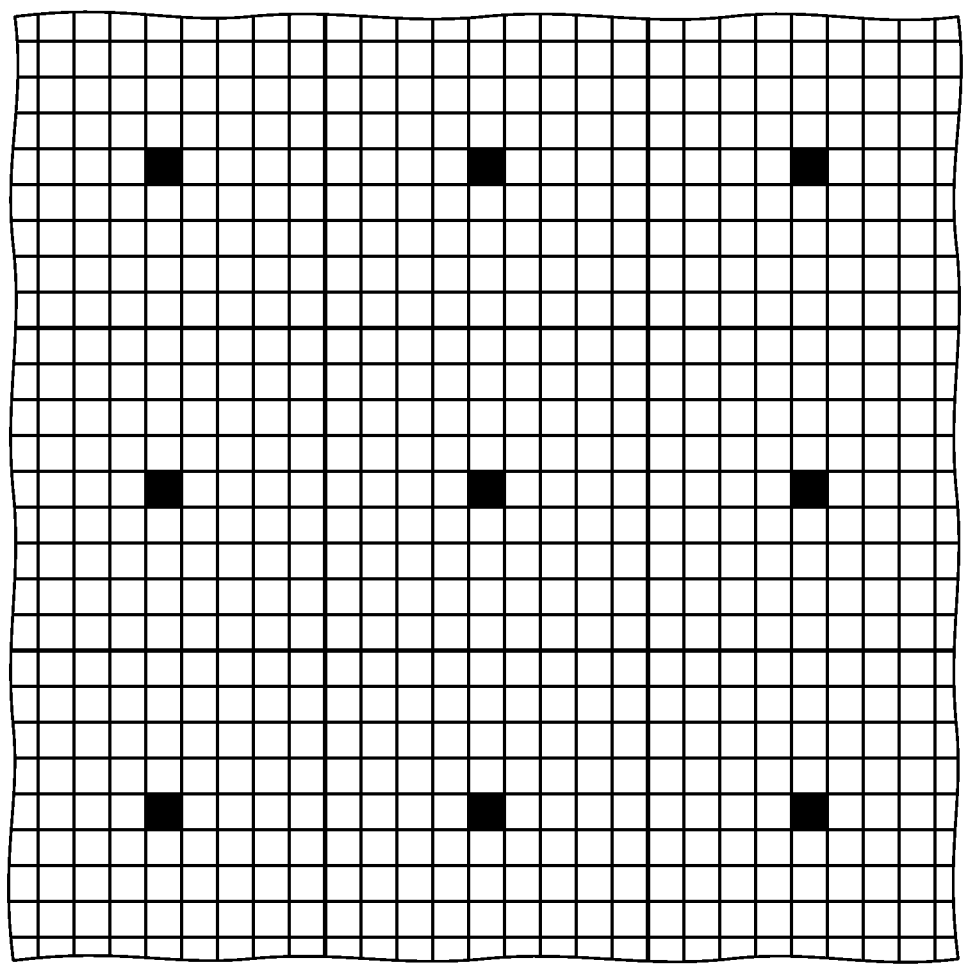
FIG. 9 is a diagrammatic illustration of a portion of the plenoptic image showing a common center pixel in a plurality of the microlens images.

The first step in the rendering processing is to obtain or create sub-aperture images. A sub-aperture image is obtained or created by sampling the plenoptic image data at individual locations (the same or common location) from each microlens image. As diagrammatically shown in FIG. 9, a sub-aperture image 2010 may be obtained by selecting, for example, common center pixels of the plurality of microlens images of plenoptic image 2000 (FIG. 8). In this exemplary embodiment, it is possible to obtain a plurality of sub-aperture images based on selecting different common pixels, e.g., one to the left of the center, one to the right of the center, one above center, one below center, etc. of the plurality of microlens images to obtain 81 different sub-aperture images. For simplicity in the example, the theoretical plenoptic image data shown in FIG. 9 diagrammatically illustrates microlens images whose sizes are scaled to a number of whole pixels and sample locations that line up with specific pixel locations. However, it will be appreciated by those skilled in the art that in the plenoptic image and microlens image data such as shown in FIG. 8, the dimensions of the microlens data may not be exactly divisible by an integer number of pixels and therefore a common location under each microlens may require some type of interpolation to sample the microlens image data, and/or to obtain or create the sub-aperture image. Since each of the sub-aperture images is generated using only one common location from each microlens image, the resulting sub-aperture image is generally noisy based on being formed by a relatively small amount of actual data. In the example from FIG. 9, the sub-aperture image created by using the center pixel of each microlens image is only using 1/81 of the actual data. From an optical point of view, a single sub-aperture image represents data captured from a small portion of the optical aperture, hence the name sub-aperture image. The sub-aperture image or sub-aperture image data or portions thereof representative of a decodable image, depending on the quality of the image or data, may itself be used in controlling the operating parameters of the indicia reading terminal and/or result in a successful decoding of the decodable indicia as described below.

Figure 10:
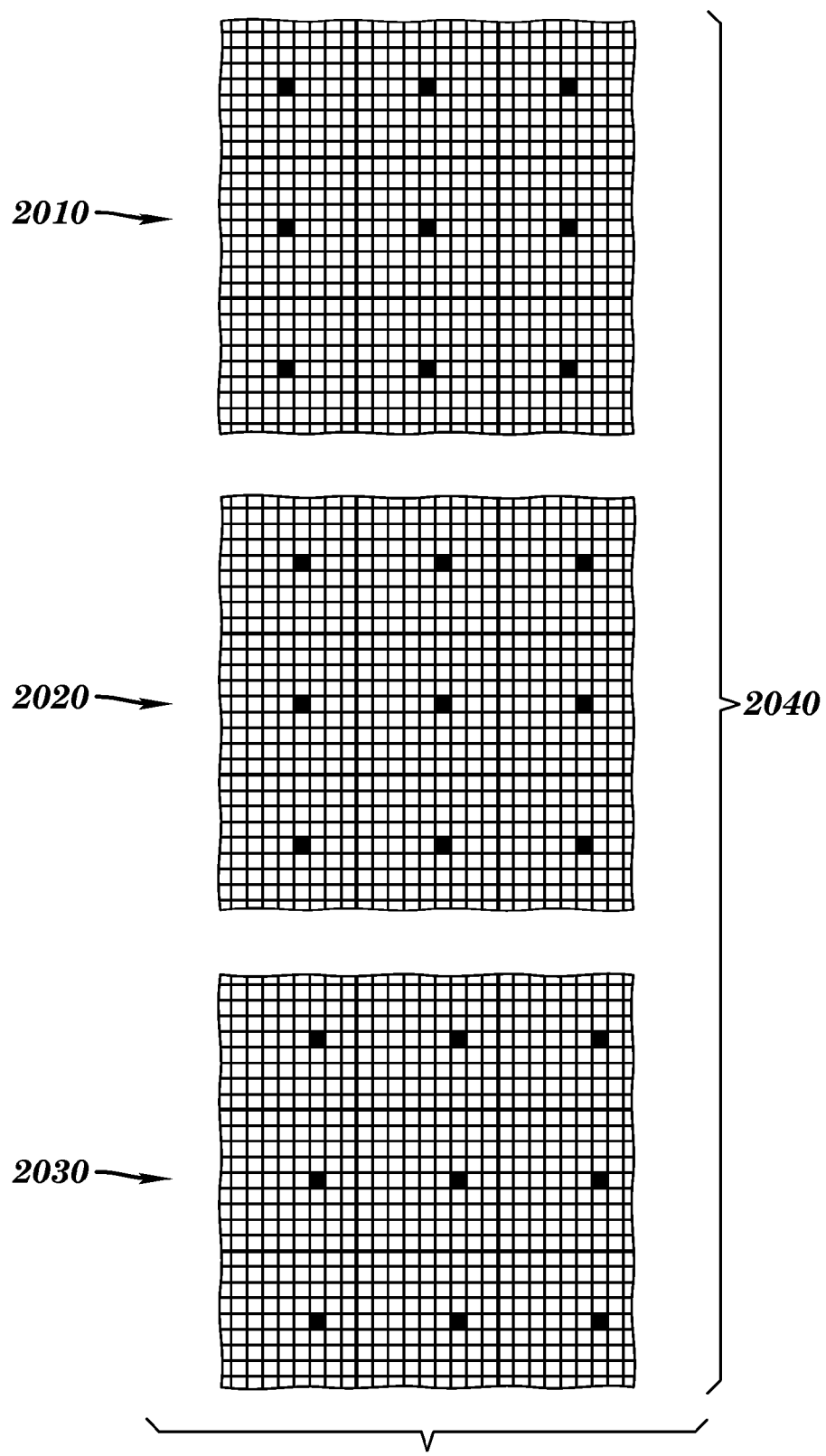
FIG. 10 are diagrammatic illustrations of a portion of the plenoptic image showing a common center pixel in a plurality of the microlens images of the plenoptic image; a common pixel one to the right of the center pixel in the plurality of the microlens images of the plenoptic image, and a common pixel two to the right of the center pixel in the plurality of the microlens images of the plenoptic image.

FIG. 10 illustrates portions of three different sub-aperture images indicating three different commonly selected locations for obtaining the different sub-aperture images. For example, a first sub-aperture image 2010 may be obtained using the center pixel, a second sub-aperture image 2020 may be obtained using the pixel to the right of the center pixel, and a third sub-aperture image 2030 may be obtained using the pixel two pixels to the right of the center pixel. As described above regarding FIG. 9, the theoretical plenoptic image data diagrammatically shown in FIG. 10 illustrates microlens images whose sizes are scaled to a number of whole pixels and sample locations that happen to line up with specific pixel locations, and offsets from location to location for creating additional sub-aperture images which also involve offset values of whole integer pixel dimensions. However, it will be appreciated by those skilled in the art that in the plenoptic image and microlens image data shown in FIG. 8, the dimensions of the microlens data may not be exactly divisible by an integer number of pixels and therefore the common location under each microlens may require some type of interpolation to sample the microlens image data, and/or to obtain or create the sub-aperture image, also the offset from location to location under the microlens to create additional sub-aperture images may involve a value which is not an integer multiple of pixels. The group of sub-aperture images created from a single plenoptic image is known as a sub-aperture image stack.

Figure 11:
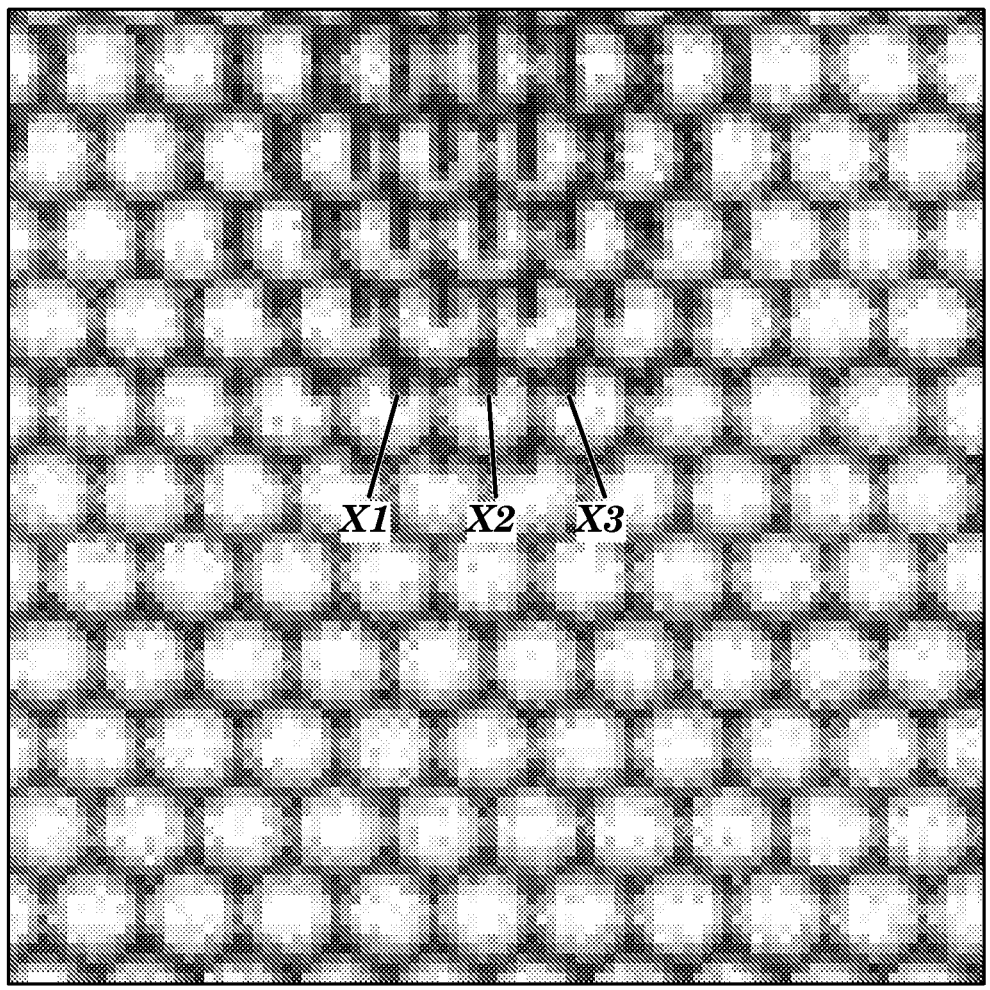
FIG. 11 is an enlarged view of a portion of the plenoptic image of FIG. 7 illustrating observed offset image portions in different microlens images.

FIG. 11 is an enlarged view of a portion of plenoptic image 2000 of FIG. 7 illustrating different microlens images showing X1, X2, and X3 which represent the same feature (e.g., one of the bars of decodable indicia) in three adjacent microlens images. Notice that X1, X2, and X3 are at different pixel locations in their respective microlens images. This location difference will manifest itself by having this feature show up at different pixel locations in the resulting sub-aperture images.

The process of obtaining or creating rendered images involves the combining of two or more sub-aperture images in the sub-aperture image stack, offset from one another in such a way so that a feature of interest, or features at a specific distance from the device, is aligned between all of the sub-aperture images used in the rendering. The process of combining the sub-aperture images may involve averaging or interpolating between the sub-aperture images, or may involve creating a transform by which the resulting rendered image is created by sampling the plenoptic image data itself. Although the locations used to sample the microlens images and create the sub-aperture images can be virtually anything, by using microlens image sample locations for creating each sub-aperture image in the sub-aperture stack that are fixed distances apart, the offset used for rendering a specific feature, or a specific distance, that is in focus becomes a constant for rendering sub-aperture images who's microlens image sampling locations are adjacent to each other. This offset is known as the rendering offset. The changing of the rendering offset results in renderings which are focused at different distances from the camera.

For example, a given rendering offset may be selected or determined and applied to the sub-aperture image stack. For each sub-aperture image in the sub-aperture image stack, provided the sample locations of the microlens images are a fixed distance apart, the rendering offset will be applied as a constant, multiplied by the number of fixed distances the microlens image sample locations are apart between sub-aperture images that are being combined. For example, if starting with a sub-aperture image generated from a given reference location under the microlenses, and it was determined that the rendering would involve offsetting the sub-aperture image generated from a next location a fixed distance from the reference location to the right or left, or up or down by an offset X, then the sub-aperture image generated from a location 2 times the fixed distance from the reference location to the right or left or up or down, would be offset by 2X in the rendering, and so forth.

Figure 12:
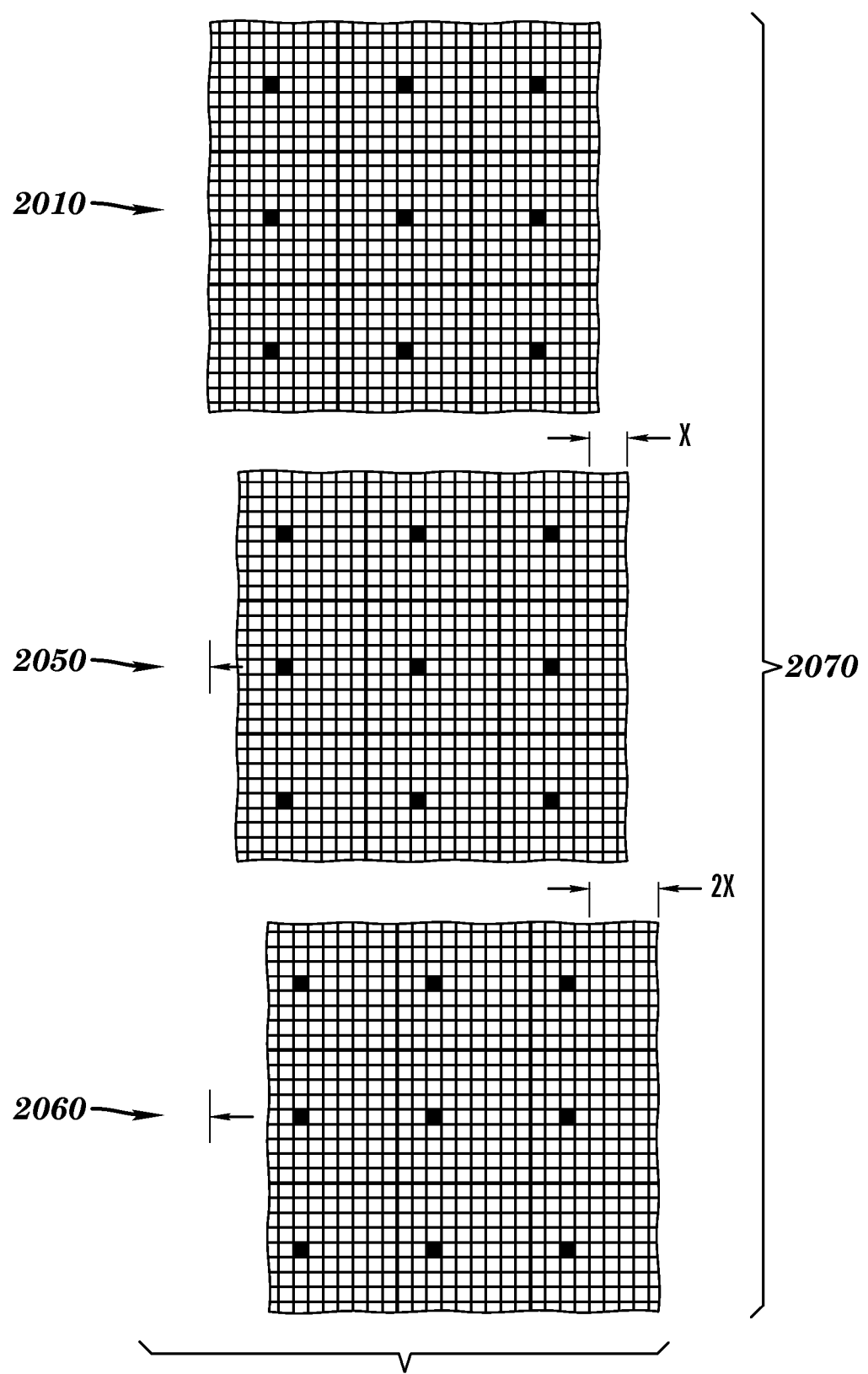
FIG. 12 are diagrammatic illustrations of a portion of the plenoptic image showing a common center pixel in a plurality of the microlens images of the plenoptic image; a common pixel one to the left of the center pixel in the plurality of the microlens images of the plenoptic image, and a common pixel two to the left of the center pixel in the plurality of the microlens images of the plenoptic image.

For example, with reference to the diagrammatic illustrations in FIG. 12, a sub-aperture image 2010 may be obtained using the center microlens image pixel location, a second sub-aperture image 2050 may be obtained using the microlens image location a single pixel to the left of the center pixel location, and a third sub-aperture image 2060 may be obtained using the microlens image location which is two pixels to the left of the center pixel location. Thereafter, the placement of the layers relative to each other is aligned using a rendering offset and combined to form a rendered image 2070.

In this example, beginning with the sub-aperture image 2010, sub-aperture image 2050 may be shifted horizontally a distance X, e.g., the distance of two pixels to the right, and sub-aperture image 2060 may be shifted horizontally a distance 2X such as the distance of four pixels to the right. Should we have an additional sub-aperture image sampled using the microlens image location three pixels to the left of the center pixel location (not shown in FIG. 12), its placement would be shifted horizontally 3X (i.e. six pixels) to the right for inclusion in rendered image 2070. Likewise, if an additional sub-aperture image was generated using the microlens image location a single pixel above the center pixel location, its placement would be adjusted vertically 1X (i.e. two pixels) down for inclusion in the rendered image. The sub aperture images which are generated using microlens image locations which have both a horizontal and vertical component from the center reference location would be offset a corresponding X amount in both a horizontal direction and a vertical direction where the multiples of X in the horizontal and vertical direction are proportional to the location of the microlens sample location for generating the sub-aperture image relative to the center location. So looking back to our example in FIG. 12, if a sub-aperture image had a microlens sample location which was 4 pixels to the left of center and 3 pixels above center (not shown in the figure), the resulting sub-aperture image would be shifted 4X (i.e. 8 pixels) to the right, and 3X (i.e. 6 pixels) down as part of the rendering. The horizontal and vertical multiples of the rendering offset in the combining of 2 sub-aperture images in a rendering correlate to the horizontal and vertical differences, respectively, in microlens image sample locations for the generation of the two sub-aperture images which will be combined. Therefore, horizontal differences in the sample locations of the microlens images for generating the 2 sub-aperture images will result in a horizontal multiple of the rendering offset for rendering, and likewise vertical differences in the sample locations of the microlens images for generating the 2 sub-aperture images will result in a vertical multiple of the rendering offset for rendering.

The more images used from a sub-aperture stack to create a rendering, the higher the quality of the rendering will be. This is because more and more data is being combined to create the rendered image.

Figure 13:
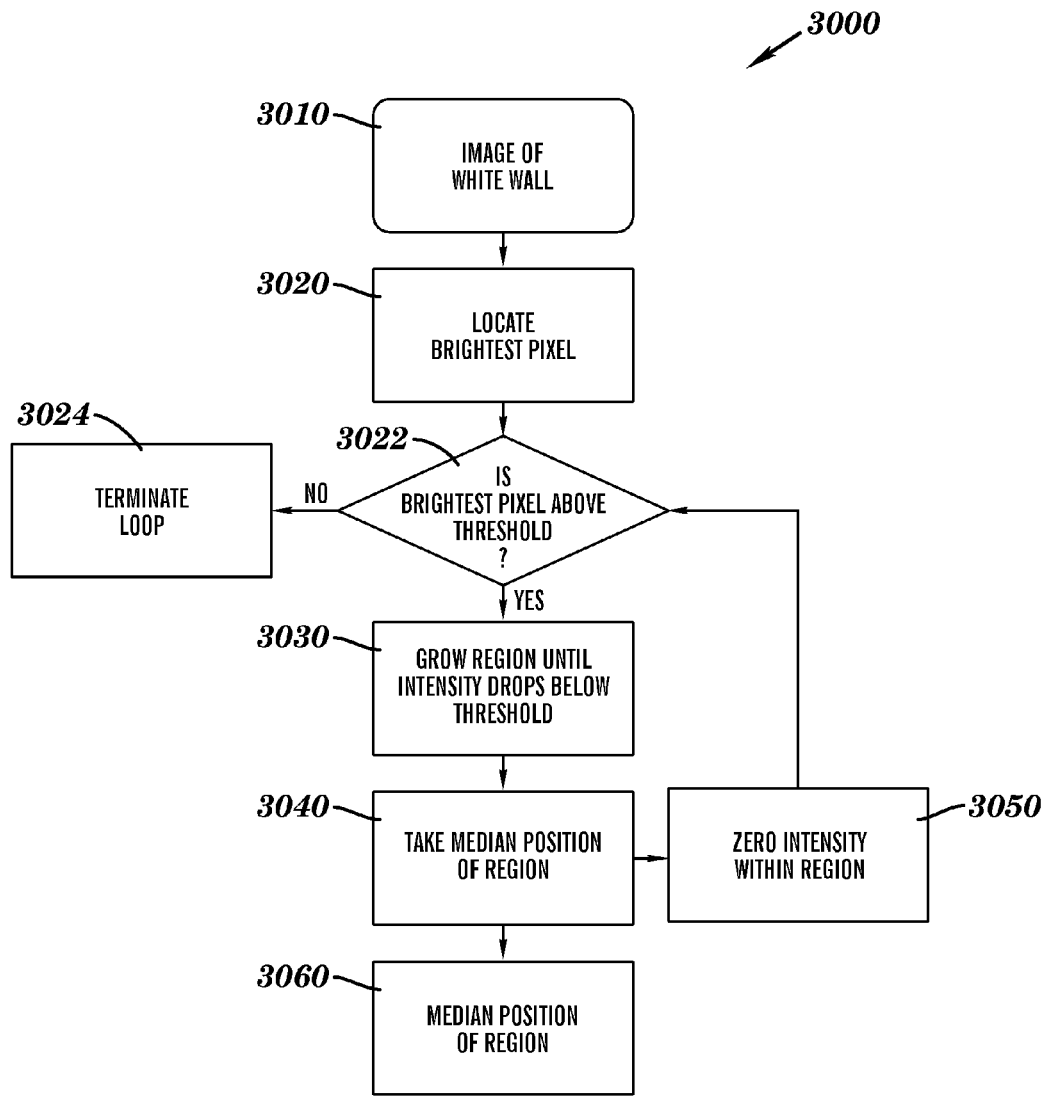
FIG. 13 is a flowchart of one embodiment of a process for determining microlens image centers.

FIG. 13 illustrates a flowchart of a first high-level step or calibration process 3000 for determining the center locations of the microlens images in the sensor imager array. For example, at 3010 an image of a white wall is obtained. At 3020, the brightest pixel is located. If the brightest pixel is above a threshold, the surrounding region is grown until the intensity of the periphery of the region drops below that threshold at 3030. At 3040, the median position of the region is taken. At 3050, the intensity within the initial region is zeroed, and the process is repeated until no remaining pixel is above threshold. At 3060, at the output is a set of pixel positions, each the center of projection of a microlens. Alternatively, it will be appreciated that the manufacturer of a plenoptic imaging system may provide the center locations of the microlens images within the plenoptic image.

Figure 14:
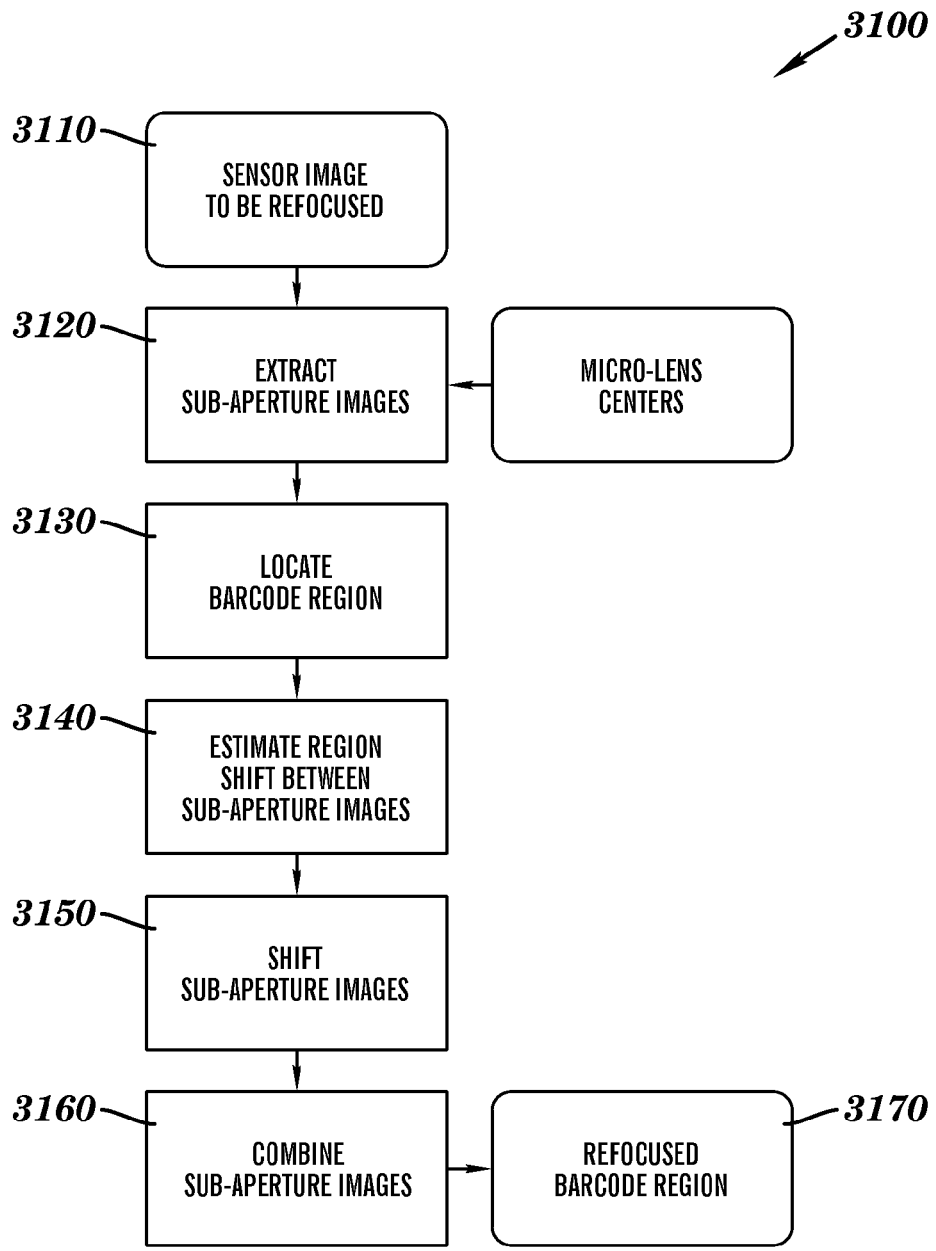
FIG. 14 is a flowchart of one embodiment of a process for generating a rendered image from plenoptic image data using the indicia reading terminal of FIG. 1.

FIG. 14 illustrates a general overview of one embodiment of a process 3100 for rendering an image of a representation of a decodable indicia from a plenoptic image of the decodable indicia. Initially, at 3110, a plenoptic image is obtained as plenoptic image data from the sensor array. At 3120, the sub-aperture images are extracted. To do this, calibrated reference data such as the center locations for each microlens may be determined as described above. Then, the resulting sub-aperture image for the center locations is created, and then additional sub-aperture images for locations one distance to the right, to the left, up, down, etc.; are also created. At 3130, a decodable indicia region or barcode region is located in one of the sub-aperture images. The selection of a desired region is further described below in greater detail. For example, in a hand held scanning system, since it is likely that the system contains an imaging system which directs the operator to position the decodable indicia in the center of the plenoptic image, the center portion of the plenoptic image may be selected as the area used to determine the rendering offset.

At 3140, an estimated rendering offset to be used to combine the sub-aperture images is selected. For example, that may be a predetermined rendering offset initially selected based on a known rendering offset for rendering an image when the plenoptic image is disposed at a typical distance from the indicia reading terminal. The rendering offset may additionally be calculated by aligning features in the sub-aperture images at a given location in the sub-aperture images.

At 3150, the various sub-aperture images are accordingly shifted per the rendering offset. This may be done by shifting the images from left to right and/or up and down as described as above. At 3160, the sub-aperture images are combined to generate a rendered image at 3170, e.g., generally a representation of a refocused decodable indicia. This combining may comprise of adding, averaging, interpolating, or other techniques of combining multiple pieces of data into a single conglomerate.

If an attempted decode of the representation of the decodable indicia is unsuccessful, a second estimated rendering offset, either larger or smaller than the initial rendering offset, may be employed to generate another rendered image for attempted decoding. The process may be continued for a number of rendered images and attempted decoding.

In other embodiments, the selected rendering offset may be selected based on a distance sensor. For example, the indicia reading terminal may include a distance sensor for proving a signal correlated to an observed distance between the indicia reading terminal and the decodable indicia being imaged. A predetermined table stored in the indicia reading terminal may be employed for correlating the distance to a predetermined rendering offset. The predetermined table may be set up or calibrated after manufacture or set up based on the components of the imaging subsystem. For example, in the situation where an operator will typically image a decodable indicia at a location of about 1 foot from the indicia reading terminal, then the constant selected offset may be chosen to cause the rendered image to have a more detailed image, e.g., better focus, of the light field at 1 foot from the indicia reading terminal. For example, a rendering offset of 3 pixels may correspond to a focus at about 1 foot from the indicia reading terminal, a rendering offset of 5 pixels may correspond to a focus at about 6 inches from the indicia reading terminal, and a rendering offset of 2 pixels may correspond to a focus at about 1½ inches from the indicia reading terminal. While sub-aperture images may be obtained for each of the pixels in a microlens image, e.g., 81 sub-aperture images or layers, it will be appreciated the using less sub-aperture images or layers may allow for suitable decoding. For example, using less sub-aperture images or layers may allow for faster decoding compared to using more sub-aperture images or layer.

Another approach to providing a rendered image may be to use Fourier transformation techniques. For example, analysis of light-field imaging structure and optics provides insight on the interactions between the main lens system and the microlens array in light-field imaging system. Based on results of this analysis, the terminals of the present disclosure may exploit the fact that, at every plane of depth, the radiance contains a considerable amount of positional information about the scene, encoded in the angular information at that plane. Accordingly, embodiments may be referred to as full-resolution because embodiments make full use of both angular and positional information that is available in the four-dimensional radiance, as shown in the analysis. In contrast to the resolution techniques described above, which may create high-resolution images from sub-pixel shifted low-resolution images, suitable processing employing Fourier transformation techniques may render high-resolution images directly from the radiance data. For example, such terminals of the present disclosure may generate light-field images that are amenable to radiance processing techniques such as Fourier slice refocusing as is know in the art.

Suitable plenoptic imaging systems for obtaining plenoptic images and data, and obtaining rendered images or data is disclosed in U.S. Patent Application Publication No. 2012/0281072 by Georgiev et al.; U.S. Patent Application Publication No. 2012/0327222 by Ng; U.S. Pat. No. 7,936,392, issued to Ng et al.; U.S. Pat. No. 8,238,738 issued to Georgiev, and U.S. Pat. No. 8,290,359 issued to Georgiev, the entire subject matter of these patents and applications being incorporated herein by reference. Other suitable plenoptic imaging systems for obtaining plenoptic images and data, and obtaining rendered images or data is disclosed in Ren Ng's Ph.D. dissertation, "Digital Light Field Photography", Stanford University 2006, which is also incorporated herein in its entirety by reference. In addition, plenoptic image and rendered images are provided by light field cameras available from Lytro, Inc., Mountain View, Calif. Features of such systems and cameras may be suitably employed in connection with the techniques of the present disclosure regarding reading and decoding decodable indicia.

The present disclosure is neither limited to any single aspect nor embodiment for obtaining plenoptic image data or processing thereof to obtain microlens image sample locations, sub-aperture images, sub-aperture image stacks, or rendering offsets, nor to any combinations and/or permutations of such aspects and/or embodiments for obtaining plenoptic image data or processing thereof to obtain layers, stacked images, or stacked and offset layers. For example, a sub-aperture image may be obtained using two adjacent pixels, or a plurality of different sub-aperture images may be obtained using different pairs of pixels. In addition, the present disclosure is neither limited to any single aspect nor embodiment for obtaining plenoptic image data or processing thereof such as via Fourier transformation techniques, Fourier slice refocusing, or other processing techniques.

Decoding of Decodable Indicia Using Plenoptic Image Data

Figure 15:
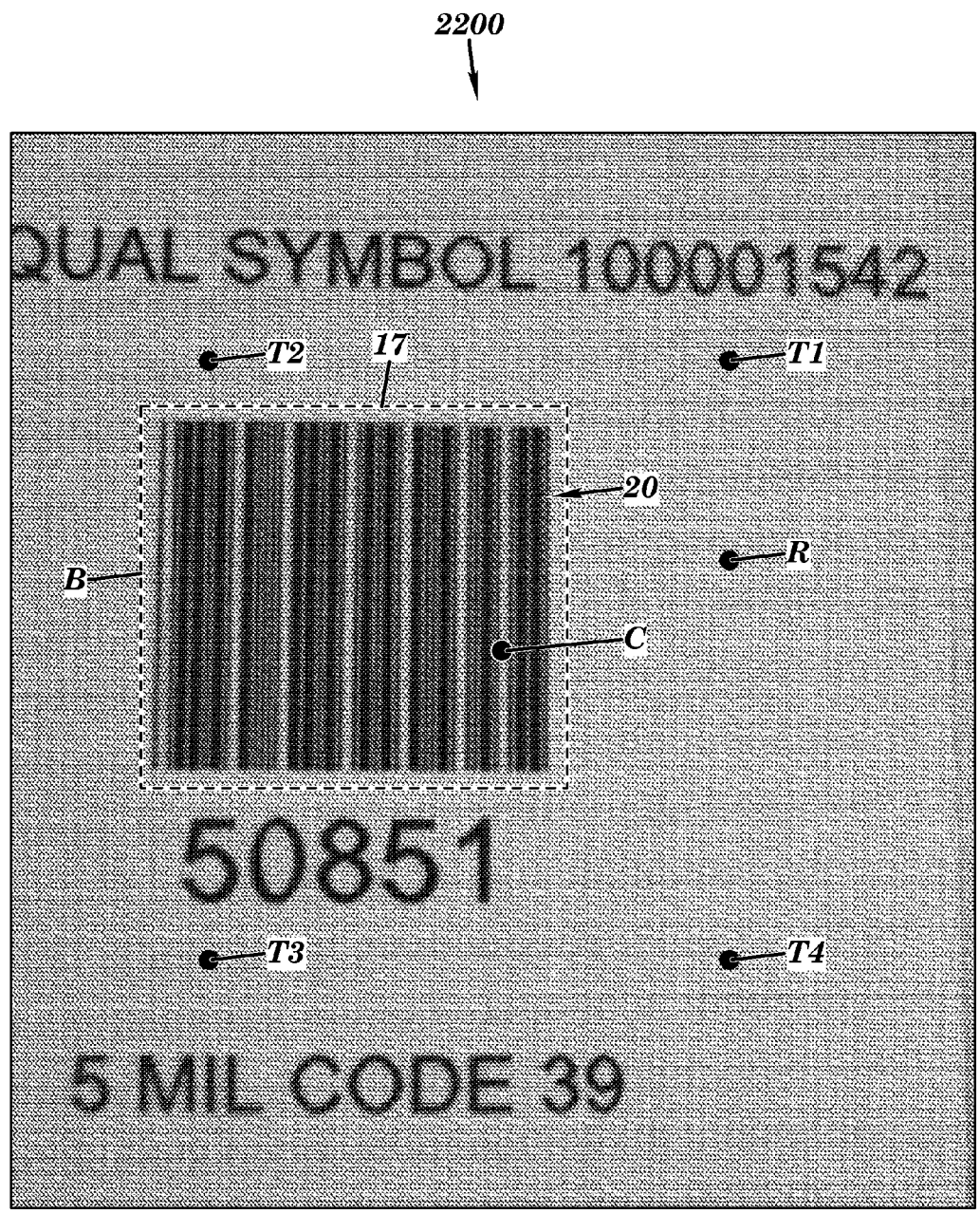
FIG. 15 is another plenoptic image of a decodable indicia obtained using the device of FIG. 1.

The results of the obtaining and processing of plenoptic image data of one of more decodable indicia may be further understood in connection with FIG. 15. For example, FIG. 15 illustrates a plenoptic image 2200 containing a decodable indicia 17.

In various aspects, the present disclosure is directed to indicia reading terminals for decoding decodable indicia which includes the indicia reading terminal operable to read-out plenoptic image data of the decodable indicia from the image sensor array and operable to attempt to decode the decodable indicia using the plenoptic image data.

The read out of plenoptic image data of the image sensor may be a frame of the entire plenoptic image data, or a frame of less than the entire plenoptic image data, i.e., a portion of the entire frame of plenoptic image data. The decoding of the decodable indicia using the plenoptic image data may be of the entire frame of plenoptic image data, or a portion of the entire frame of the plenoptic image data.

The portion of the entire frame of the plenoptic image data may be in connection with a portion of the planar size of the plenoptic image having, for example, a width and a height. The portion of the entire frame of the plenoptic image data may also be in connection with portions of the entire frame of the plenoptic image data operable to obtain specific rendered images, e.g. such as using specific common pixels as described above. The portions may also correspond to a combination thereof. It will be appreciated that other selective portions and further combinations thereof may be employed in the techniques of the present disclosure.

With reference still to FIG. 15, in one configuration of the indicia reading terminal, upon a trigger signal affected by an operator, a frame corresponding to the entire plenoptic image data 2200, for example as illustrated in FIG. 15, may be operably read out and stored in memory. Initially, once the plenoptic image is obtained, indicia reading terminal may be operable to attempt to decode the decodable indicia represented in the plenoptic image data without obtaining a sub-aperture image or rendered image, i.e., using the plenoptic image as is. If successful, the process is terminated, for example, and the indicia reading terminal awaits receipt of the next trigger signal. This may allow for a quick reading and decoding, for example, if the decodable indicia was imaged at a particular distance or range of distances from the indicia reading terminal resulting in a suitable decodable image or data. The indicia reading terminal may also be operable to obtain one or more sub-aperture images or sub-aperture image data thereof. The indicia reading terminal may be operable to attempt to decode the decodable indicia represented in one of or a single sub-aperture image or a corresponding sub-aperture image data thereof, cycle through a series of different single sub-aperture images or corresponding sub-aperture image data thereof until a successful decode is obtained or stop after a number of unsuccessful attempts. The indicia reading terminal may be operable to attempt to decode the decodable indicia represented in a plurality of stacked sub-aperture images or a corresponding sub-aperture image data thereof, cycle through a series of a different plurality of stacked single sub-aperture images or corresponding sub-aperture image data thereof until a successful decode is obtained or stop after a number of unsuccessful attempts. Such attempts to decode a single sub-aperture image or corresponding data, may allow for a quicker reading and decoding compared to obtaining a plurality of sub-aperture images and then rendering a focused frame. An attempt using a single sub-aperture image may be attempted while the remaining sub-aperture images are being obtained and rendered.

As described above, the stored plenoptic image data also contains data for obtaining various rendered images which may provide a better or more detailed representation of the decodable indicia or data from which to attempt a decode. For example, a plurality of different sub-aperture images may be obtained, and rendered by combining the sub-aperture images per the rendering offset as described above. For example, a first plurality of sub-aperture images may be obtained and a first rendering offset applied to the plurality of sub-aperture images to obtain a first rendered image. Desirably, this may be applied with obtaining a better quality image at the typical area where a decodable indicia is likely to be present. The indicia reading terminal may be operable to attempt to decode the decodable indicia represented in the first rendered image. If the first attempt results in an unsuccessful decode, additional rendered images may be obtained. For example, each of the sub-aperture images may be obtained using a randomly selected common pixel, a predetermined common pixel, and/or pixel selected based on an input or other variables, and rendered using a randomly selected rendering offset, a predetermined rendering offset, and/or rendering offset based on one or more input or other variables. Such inputs or variables may be based on a distance measurement from the indicia reading terminal to the decodable indicia, an aimer pattern, or any suitable input or variables. The indicia reading terminal may cycle through a series of a plurality of differently rendered images or corresponding rendered image data thereof, until a successful decode is obtained or stop after a number of unsuccessful attempts.

In another embodiment, the indicia reading terminal of the present disclosure may suitably analyze the selected common pixels, the rendering offset, the number of obtained sub-aperture images, and the results of the decoding of the resulting rendered images. Such analysis may result in optimizing the parameters for obtaining one or more rendered images for use in decoding. For example, the analysis may determine preferred different common pixels for selection in obtaining sub-aperture images, the number of sub-aperture images to obtain, and/or the rendering offset to apply.

In another embodiment, indicia reading terminal may initially generate a plurality of rendered images, and then after generation thereof attempt to decode a decodable indicia in one or more of the plurality of rendered images. For example, with reference again to FIG. 1, the indicia reading terminal may be operable to generate a plurality of rendered images that divide up the depth of field of space S, and may correspond to, for example, rendered images associated with object planes P1 and P2. The space may be divided up in any number of associated planes based on the number of pixels in a sub-image. Suitable processing may be employed to obtain a generally detailed and better focused rendered image or corresponding data along each plane. Then, with reference again to FIG. 15, the indicia reading terminal may be operable to use a selected corresponding point or location on the plenoptic image, obtain the rendered image having, for example, the subject matter in an area containing the selected point in focus. For example, based on the selected point or location, a comparison or sampling based on sharpness value of similar areas containing the selected point or location may be made to obtain a desired rendered image of use in decoding the representation of the decodable indicia.

Figure 16:
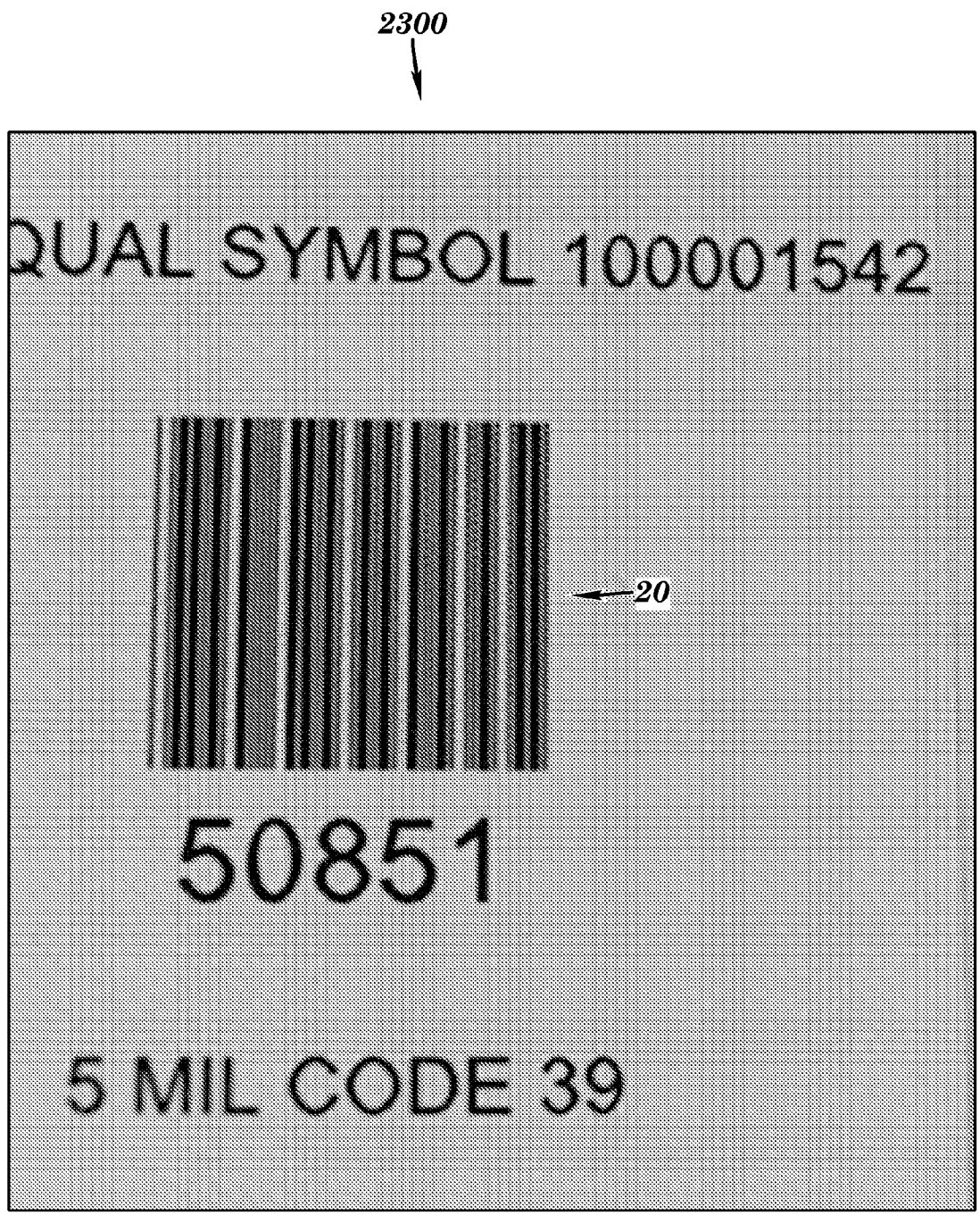
FIG. 16 is a rendered image based on the plenoptic image of FIG. 15.

For example, a selection of a rendered image obtained from the plenoptic image data may be based on a center portion or center point C, as shown in FIG. 15, which may corresponds to the center of the of the plenoptic image. FIG. 16 illustrates a rendered image 2300 having, for example, decodable indicia 20 being in focus. The indicia reading terminal may be operable to attempt to decode the decodable indicia represented in the rendered image. If successful, the process is terminated, for example, and the indicia reading terminal awaits receipt of the next trigger signal. Since an operator will typically locate the decodable indicia in or near the center of the plenoptic image, a single rendered image may result in a successful decode.

With reference again to FIG. 15, other processes for selecting a rendered image may include a randomly selected rendered image based on a random portion or point R in the plenoptic image, or the indicia reading terminal operable to provide a series of rendered images, for example, first starting in the center, and then obtaining a series of rendered images based on predetermined location or points T1, T2, T3, and T4, which may correspond to areas nearer the corners of the plenoptic image. Upon obtaining a rendered image, an attempt to decode may be made while the next rendered image is being obtained. As described above, a series of rendered images may be obtained based on predetermined rendering offset corresponding to different distances from the indicia reading terminal.

With reference still to FIG. 15, in another embodiment, the indicia reading terminal may be operable to determine at least a portion of a boundary B of the decodable indicia in the plenoptic image data, and the rendering offset used to generate the rendered image is operably selected based on at least a portion of the plenoptic image data disposed within the boundary.

In another embodiment, the indicia reading terminal may be provided with an aimer subassembly 600 (FIG. 4) allowing the operator to position an aimer pattern on the decodable indicia. The indicia reading terminal may be operable to select a rendering offset used to generate the rendered image based on the location of the aimer pattern in the plenoptic image data, or rendered images or image data.

In another embodiment, the indicia reading terminal may develop a generally entire focused image that is an image with a plurality of areas each rendered separately to appear to be in focus simultaneously. Such a rendered image over the apparent entire space S (FIG. 1) being generally in focus may be operably used for decoding. For example, a plurality of rendered images may be generated as noted above. The plurality of areas may be then stitched together to form a generally entire focused image. This may provide a generally focused decodable indicia particularly when the decodable image is disposed on an angle relative to the optical axis of the indicia reading terminal, when the decodable indicia is disposed along a curved surface, or where the space includes representation of a plurality of decodable indicia disposed at different distances from the indicia reading terminal.

In another embodiment, in the indicia reading terminal, processor 1060 (FIG. 4), may comprise a multicore processor. With such a multicore processor, each core of the multicore processor may obtain a different rendered image based on the plenoptic image data. For example, each core of the multicore processor may obtain different sub-aperture images and/or apply different rendering offsets for generating different rendered images. In addition, the different cores of the multicore processor may use different portions of the plenoptic image, e.g., different areas corresponding to different surface areas of the image sensor array. Further, each core of the multicore processor may attempt to decode the obtained rendered image or images it processes. With such a configuration, use of a multicore processor environment with each core processing a different rendered image or images may allow for a quicker decode of the decodable indicia. If the plenoptic image is divided into, for example, 8 different areas or plane of focus, a different processor core can be assigned to different area or plane of focus. If there are more predetermined areas than processor cores, then specific areas may be selected first. The multicore processor may be operable to generate or obtain a stitched together rendered image with generally the entire space S (FIG. 1) in focus as described above.

Partial Read Out and Decoding of Plenoptic Image

In another aspect, the read out of a frame of plenoptic image data may comprises a partial frame or selective portion or portions of the entire plenoptic image, which may allow for faster decoding compared to using the entire plenoptic image.

In one embodiment, the read out of a partial portion of a frame of the plenoptic image may correspond to the center portion of the plenoptic image. With reference to FIG. 17, the center portion may be a portion in a center middle portion 2210 of plenoptic image 2200 or may be an elongated portion 2220 which extends across the center of the width of plenoptic image 2200. Other shaped suitable center portions or other partial portions of the plenoptic image may be operably employed.

Where the readout of the plenoptic image data is a partial frame of the plenoptic image, the indicia reading terminal may be operable to attempt to a decode decodable indicia as described above using the partial read out of the plenoptic data such as the center portion 2210 of the plenoptic image as shown in FIG. 18, or the elongated portion 2220 of the plenoptic image as shown in FIG. 19. Processing using various offset shifts, as described above, may be suitably employed.

In addition, if a frame of the entire plenoptic image data is read out of the imager and stored in memory, the indicia reading terminal may be operable to attempt to the decode decodable indicia using a partial portion of the entire read out plenoptic image data which corresponds to, for example, the partial portions described above. For example, the center portion may be a portion in the middle portion of the plenoptic image or may be an elongated portion which extends across the center of the plenoptic image, or other suitable center portion. Other shaped suitable center portions or other partial portions of the plenoptic image may be suitably employed. Thus, using only a portion of the stored plenoptic image data, for example, only using a portion to generate different sub-aperture images and rendered images, may allow for more quickly generating one or more rendered images, and thus, reducing the time to decode the decodable indicia.

Imaging and Decoding a Plurality of Decodable Indicia

Figure 20:
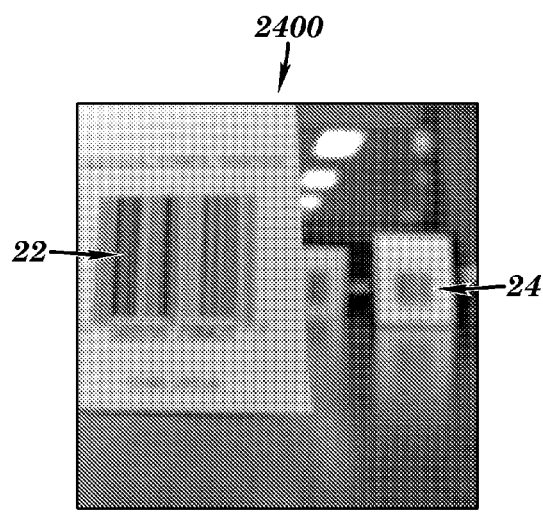
FIG. 20 is plenoptic image of a plurality of decodable indicia obtained using the device of FIG. 1.

The results of the obtaining and processing of plenoptic image data of one of more decodable indicia may be further understood in connection with FIG. 20. For example, FIG. 20 illustrates a plenoptic image 2400 containing a first decodable indicia 22, and a second decodable indicia 24. For example, in this plenoptic image, first decodable indicia 22 may be disposed closer to the indicia reading terminal, and second decodable indicia 24 may be disposed further away from the indicia reading terminal.

Figures 21, 22:
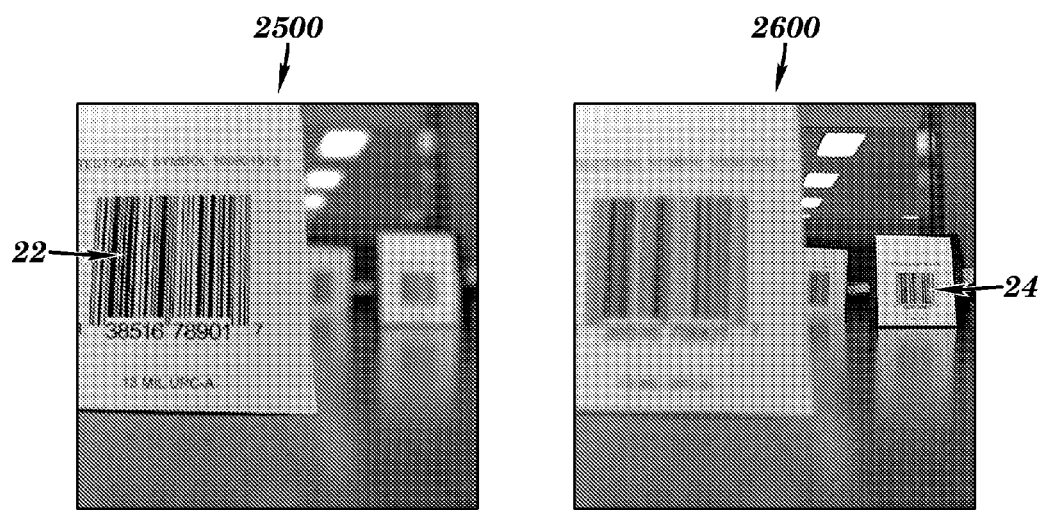
FIG. 21 is first rendered image obtained from the plenoptic image of FIG. 20 for attempting to decode the front decodable indicia.
FIG. 22 is second rendered image obtained from the plenoptic image of FIG. 20 for attempting to decode the rear decodable indicia.

The stored plenoptic image data or portion of the plenoptic image data may be similarly rendered and an attempt at decoding of the representations of the decodable indicia may be performed as described above. For example, a rendered image 2500 or corresponding rendered image data may be operable to provide a representation of decodable indicia 22 in focus as shown in FIG. 21, while a rendered image 2600 or corresponding rendered image data may be operable to provide a representation of decodable indicia 24 in focus as shown in FIG. 22. A multicore processor may be operably employed as described above to separately decode the plurality of decodable indicia.

Sharpness Value

In another embodiment, the indicia reading terminal may be operable to determine a sharpness value for a rendered image or corresponding image data prior to attempting a decode. For example, if the sharpness value is above a predetermined threshold value or within a desired range then an attempt to decode the representation of the decodable indicia is made. If the sharpness value is less than a predetermined sharpness valve, the indicia reading terminal may be operable to not attempt a decode but instead obtain another different rendered image, and again compare the sharpness value of the second rendered image before attempting a decode attempt. A sharpness value may be based on a gradient across the image. This might be developed by calculating the signal level standard deviation for the same information region in space at different locations in the depth of field. Typically the location in the depth of field with the largest signal level standard deviation would be seen as being a sharper image.

Removal of Specular Reflection

In another embodiment, the indicia reading terminal may be operable to remove specular reflections in the read out plenoptic image data, and then attempt to decode the decodable indicia using the corrected plenoptic image data. For example, where the pixels corresponding to a microlens is saturated, the processing of the indicia reading terminal may render the value of the portion of the readout plenoptic data corresponding to the saturation as zero, the value of an adjacent microlens portion of the plenoptic image data, or an averaged or other relationship to adjacent non saturated portions of the plenoptic image data. After correction, the plenoptic image data or rendered image data may be processed as described above.

The ability to remove specular reflections from images after images are captured may be desirable. For example, specular reflections on critical areas of barcodes of interest can negatively impact the decodability of the barcode to the point they cannot be decoded. Avoiding specular causing light before capturing images may be beneficial. By using digital refocusing and software manipulation algorithms specular areas of light can be removed from the barcode of interest and the barcode can then be decoded. This may be helpful in instances of single codes or where more than one code exists in an image and all codes need to be decoded.

With reference again to FIG. 4, indicia reading terminal 1000 may comprise at least one filter 225 operable to pass illumination reflected from said decodable indicia, while inhibiting at least some of ambient light reflected off said decodable indicia. For example, plenoptic imaging subsystem 900 may further comprise at least one filter 225.

Correction Of Operating Parameters Based On Plenoptic Image

In another aspect, the indicia reading terminal of the present disclosure may be operable to control the operating parameters of the indicia reading terminal based on the plenoptic image or corresponding plenoptic image data. The indicia reading terminal, responsive to detecting that the trigger has been actuated by an operator, may be operable to obtain first plenoptic image data from the image sensor array, and adjust at least one operating parameter of the indicia reading terminal based on the first plenoptic image data. Thereafter, the indicia reading terminal may be operable to project a second plenoptic image of a space containing the decodable indicia onto the image sensor array, render a first image based on at least a portion of the second plenoptic image data, and attempt to decode the decodable indicia represented in the first rendered image.

Figure 23:
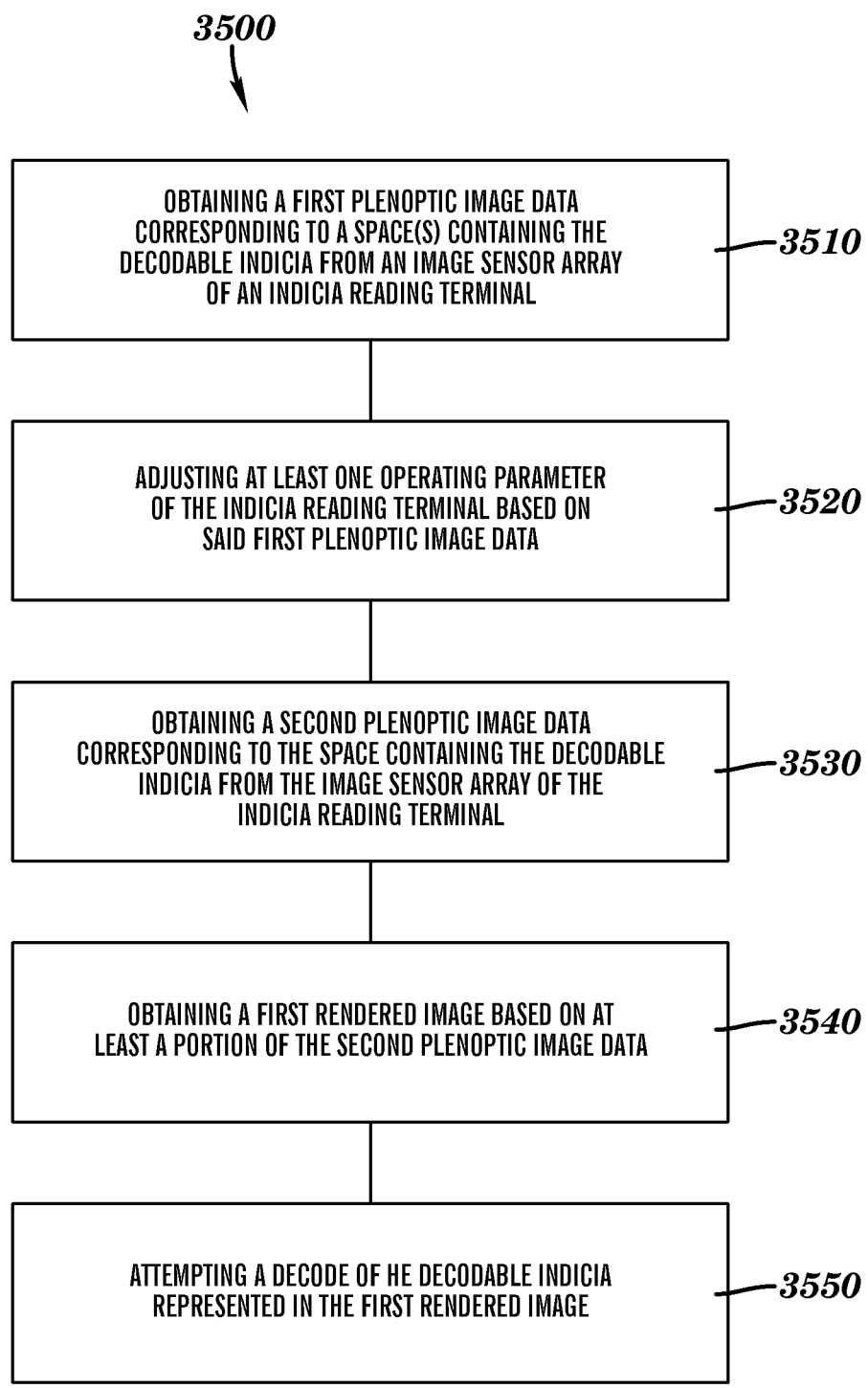
FIG. 23 illustrates a flowchart of one embodiment of a method for decoding decodable indicia in accordance with aspects of the present disclosure.

FIG. 23 illustrates a flowchart of one embodiment of a method 3500 for decoding decodable indicia which includes, at 3510 obtaining a first plenoptic image data corresponding to a space containing the decodable indicia from an image sensor array of an indicia reading terminal, at 3520 adjusting at least one operating parameter of the indicia reading terminal based on the first plenoptic image data, at 3530 obtaining a second plenoptic image data corresponding to the space containing the decodable indicia from the image sensor array of the indicia reading terminal, at 3540 obtaining a first rendered image based on at least a portion of the second plenoptic image data, and at 3550 attempting a decode of the decodable indicia represented in the first rendered image. Such parameters might include image integration time, also known as exposure time, amplifier gain, and frame rate.

With reference again to FIG. 4, the indicia reading terminal may be operable to adjust an exposure period of the image sensor array. In one embodiment, the indicia reading terminal may comprises image sensor array 1033, associated timing and control circuit 1038, and illumination module 800, all in operable electrical communication with each other. The illumination module shines light on the target, such as the decodable indicia or symbology such as one or two-dimensional bar code, so that reflected light that can be collected and processed by the image sensor array. The time during which the target is illuminated is referred to as the illumination period. The capture of the plenoptic image by the image sensor array is driven by the timing circuit that, in one embodiment, may be able to simultaneously expose all or substantially all of the pixels in the image sensor array. The time during which the pixels are collectively activated to photo-convert incident light into charge defines the exposure period for the image sensor array. At the end of the exposure period, the collected charge is transferred to, for example, a shielded storage area until the data is read out. The exposure period and the illumination period may be under the control of the control circuit. In one such embodiment, the control circuit causes at least a portion of the exposure period to occur during the illumination period.

Based on initial analyses of the first plenoptic image data or portion thereof such as a center portion, the illumination period or the exposure period may be adjusted. For example, in an environment of low ambient lighting, the illumination period and/or the exposure period may be increased. Thereafter, a second plenoptic image may be obtained and processed as described above.

Object Dimensioning

The present disclosure is also directed to imaging terminals, and in particular to imaging terminals employing plenoptic imaging for dimensioning objects. For example, light field or plenoptic imaging methods such as described above, provide the ability to render images after exposure computationally resulting in images at different focus depths of distances from the indicia reading terminal. This extra focus depth information provides additional potential for dimensioning objects represented within the image. For example, the change in depth information (i.e., the focal depth which sharply renders regions of the object) from the front edge of an object to the back edge of an object can be used in determining the size of the object. After capture of the light field with the object, suitable software programming may determine depth of focus of each transitioning surface or corner of the object. The difference in focus may then used to determine distance and/or dimensions of the object. In the field of transportation and shipping of goods, it can be useful to perform spatial measurements with respect to packages or other objects, e.g., goods that are stacked on a pallet or in the interior of a truck or shipping container. Packages and other objects often include barcode symbols including one or more of one dimensional (1D) barcodes, stacked 1D barcodes, and two dimensional (2D) barcodes.

Figure 24:
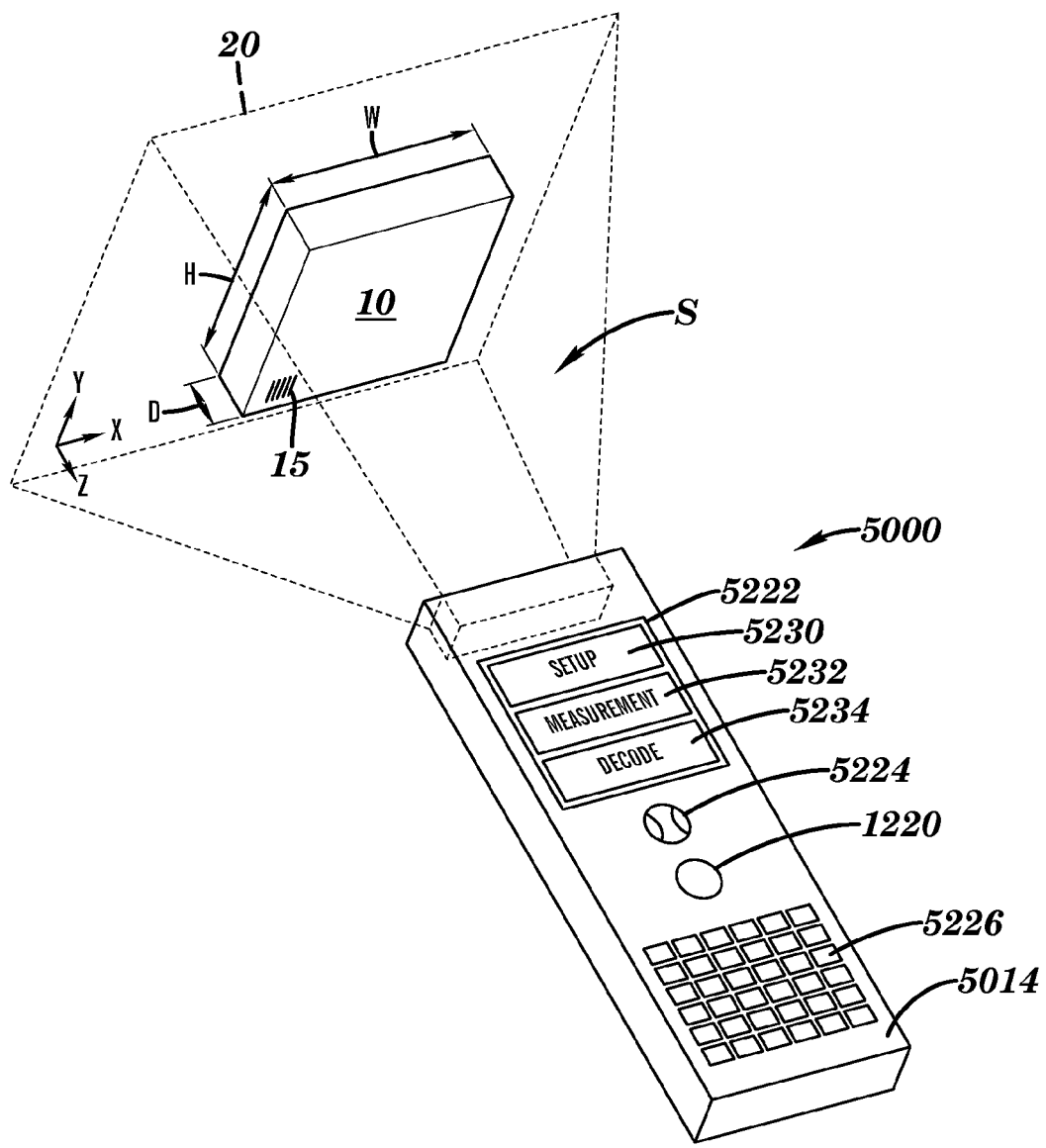
FIG. 24 is a schematic physical form view of one embodiment of an imaging device for use in dimensioning an object in accordance with aspects of the present disclosure.

FIG. 24 illustrates one embodiment of a terminal 5000 employing plenoptic imaging operable for measuring at least one dimension of an object 10 in accordance with aspects of the present disclosure. For example, terminal 5000 may determine one or more of a height H, a width W, and a depth D of an object. In addition, terminal 5000 may be operable to read decodable indicia 15 such as a barcode disposed on the object as described above. For example, the terminal may be suitable for shipping applications in which an object such as a package is subject to shipping from one location to another location. The dimension (dimensioning information) and other measurement (e.g., volume measurement information) respecting object 10 may be used, e.g., to determine a cost for shipping a package or for determining a proper arrangement of the package in a shipping container.

In one embodiment, a terminal in accordance with aspects of the present disclosure may include a plenoptic imaging subsystem operable to provide plenoptic image of the object. The terminal may be operable to attempt to determine at least one of a height, a width, and a depth based plenoptic image data as described below.

With reference still to FIG. 24, terminal 5000 in one embodiment may include a trigger 5220, a display 5222, a pointer mechanism 5224, and a keyboard 5226 disposed on a common side of a hand held housing 5014. Display 5222 and pointer mechanism 5224 in combination can be regarded as a user interface of terminal 5000. Terminal 5000 may incorporate a graphical user interface and may present buttons 5230, 5232, and 5234 corresponding to various operating modes such as a setup mode, a spatial measurement mode, and an indicia decode mode, respectively. Display 5222 in one embodiment can incorporate a touch panel for navigation and virtual actuator selection in which case a user interface of terminal 5000 can be provided by display 5222. Hand held housing 5014 of terminal 5000 can in another embodiment be devoid of a display and can be in a gun style form factor. The terminal may be an indicia reading terminal and may generally include hand held indicia reading terminals, fixed indicia reading terminals, and other terminals. Those of ordinary skill in the art will recognize that the present disclosure is applicable to a variety of other devices having an imaging subassembly which may be configured as, for example, mobile phones, cell phones, satellite phones, smart phones, telemetric devices, personal data assistants, and other devices.

Figure 25:
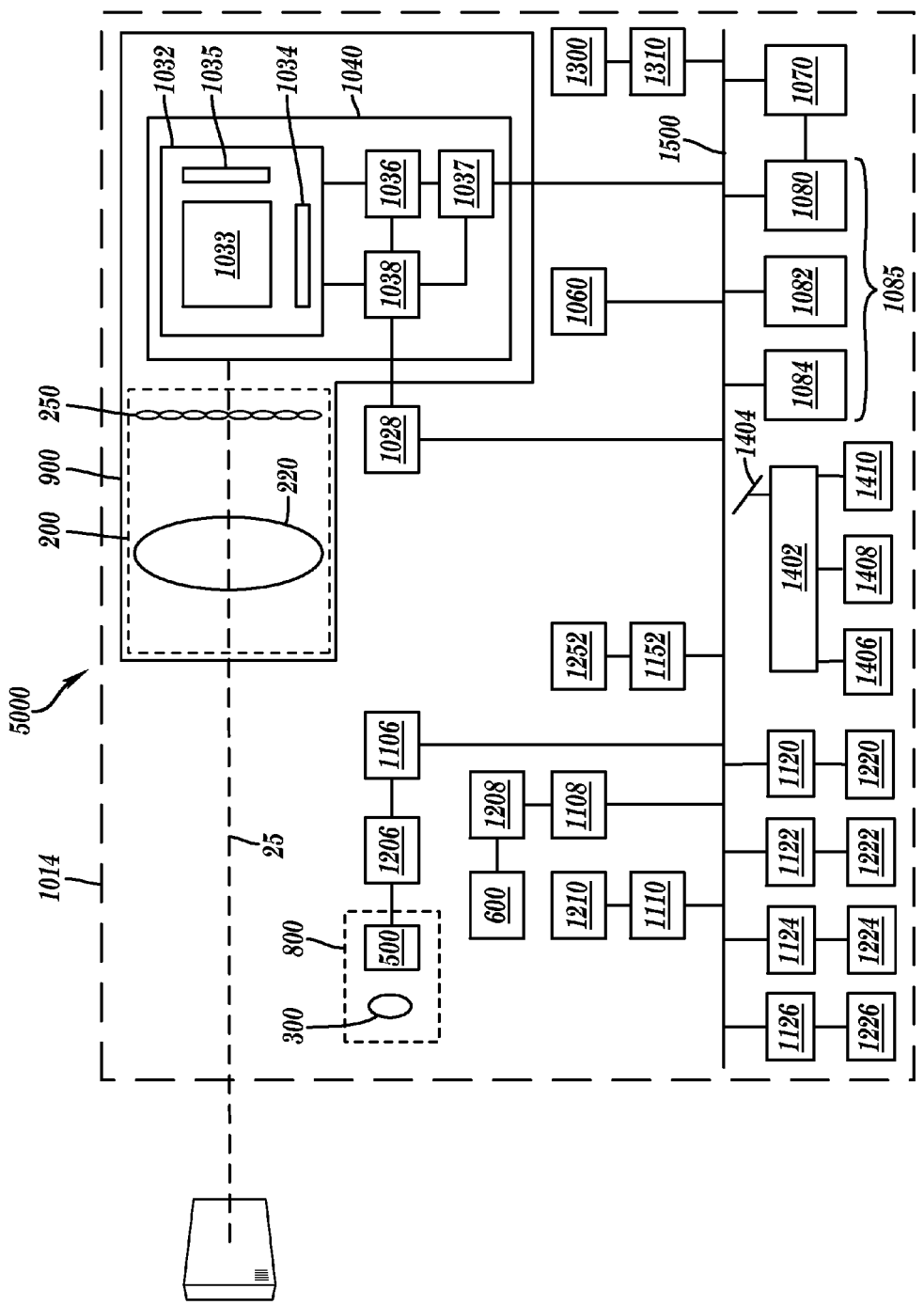
FIG. 25 is a block diagram of one embodiment of the imaging device of FIG. 24.

FIG. 25 depicts a block diagram of one embodiment of terminal 5000. Generally, indicia reading terminal 5000 may include an illumination subsystem 800, an aimer subsystem 600, an imaging subsystem 900 comprising a plenoptic imaging optics 200 and an image sensor integrated circuit 1040 having an image sensor array 1033, hand held housing 1014, a memory 1085, and a processor 1060. As described in greater detail above, plenoptic imaging optics 200 allows for projecting a plenoptic image of a space S (FIG. 24), such as a volumetric space, onto image sensor pixel array 1033. For example, plenoptic imaging optic system 200 may comprise a main lens 220 and a micro array lens 250. The microlens may comprise thousands of microlenses and the micro array lens may be disposed between the main lens and the imager array.

Hand held housing 1014 may encapsulate illumination subsystem 800, and plenoptic imaging subsystem 900. Memory 1085 is capable of storing and or capturing a frame of image data, in which the frame of image data may represent light incident on image sensor array 1033. After an exposure period, a frame of image data can be read out. Analog image signals that are read out of array 1033 can be amplified by gain block 1036 converted into digital form by analog-to-digital converter 1037 and sent to DMA unit 1070. DMA unit 1070, in turn, can transfer digitized plenoptic image data into volatile memory 1080. Processor 1060 can address one or more frames of image data retained in volatile memory 1080 for processing of the frames as described below for determining one or more dimensions of the object.

Figure 26:
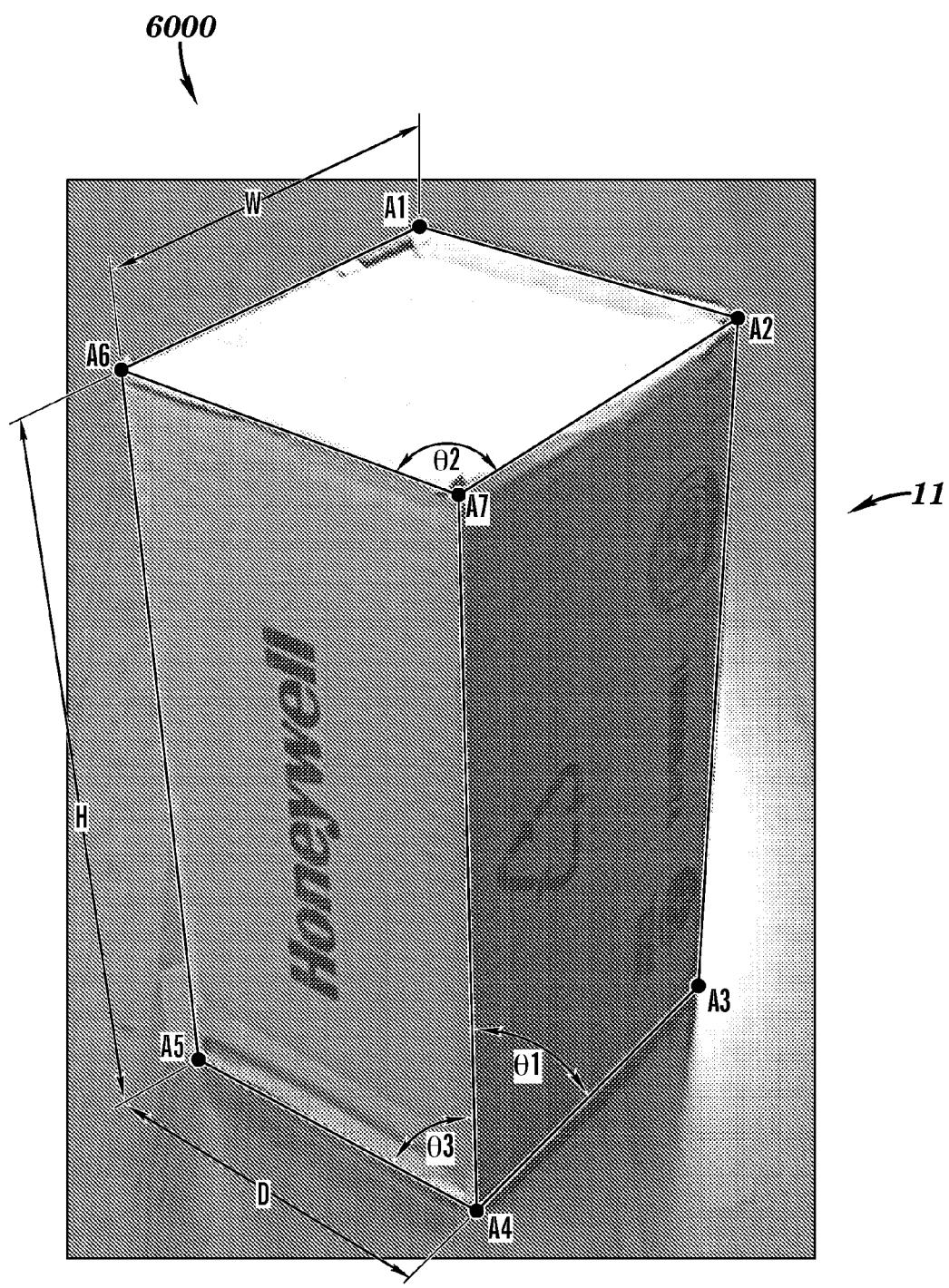
FIG. 26 is rendered image of an object.

FIG. 26 illustrates a rendered image 6000 of an object 11. Terminal 5000 may include suitable software algorithms to determine the corners of the object, for example by using the change in contrast along the edges of the object to identify the intersections of the edges. The visible corners may be identified as A1, A2, A3, etc. as shown in FIG. 26, and each visible corner may be associated with a distance from the terminal (e.g., based on the amount of shift required to align and focus a region of interest forming the corner). Using the relative locations of the corners, the angles between the edges $\Theta 1$, $\Theta 2$, and $\Theta 3$, and/or the distance from the terminal to each of the corners, width W, height H, and/or depth D may be determined for object 11. From such information, a volumetric measurement may be readily determined.

In one embodiment, the imaging terminal may be used for estimating one or more distances to an object in a scene. Since information regarding distances to each point in an image is available in the plenoptic image data along with the extent in x and y coordinates of pixels and/or microlens images, the size of the pixels and/or microlens images may be determined. Further, the absolute size and shape of physical items may be measured without other reference information.

Figure 27:
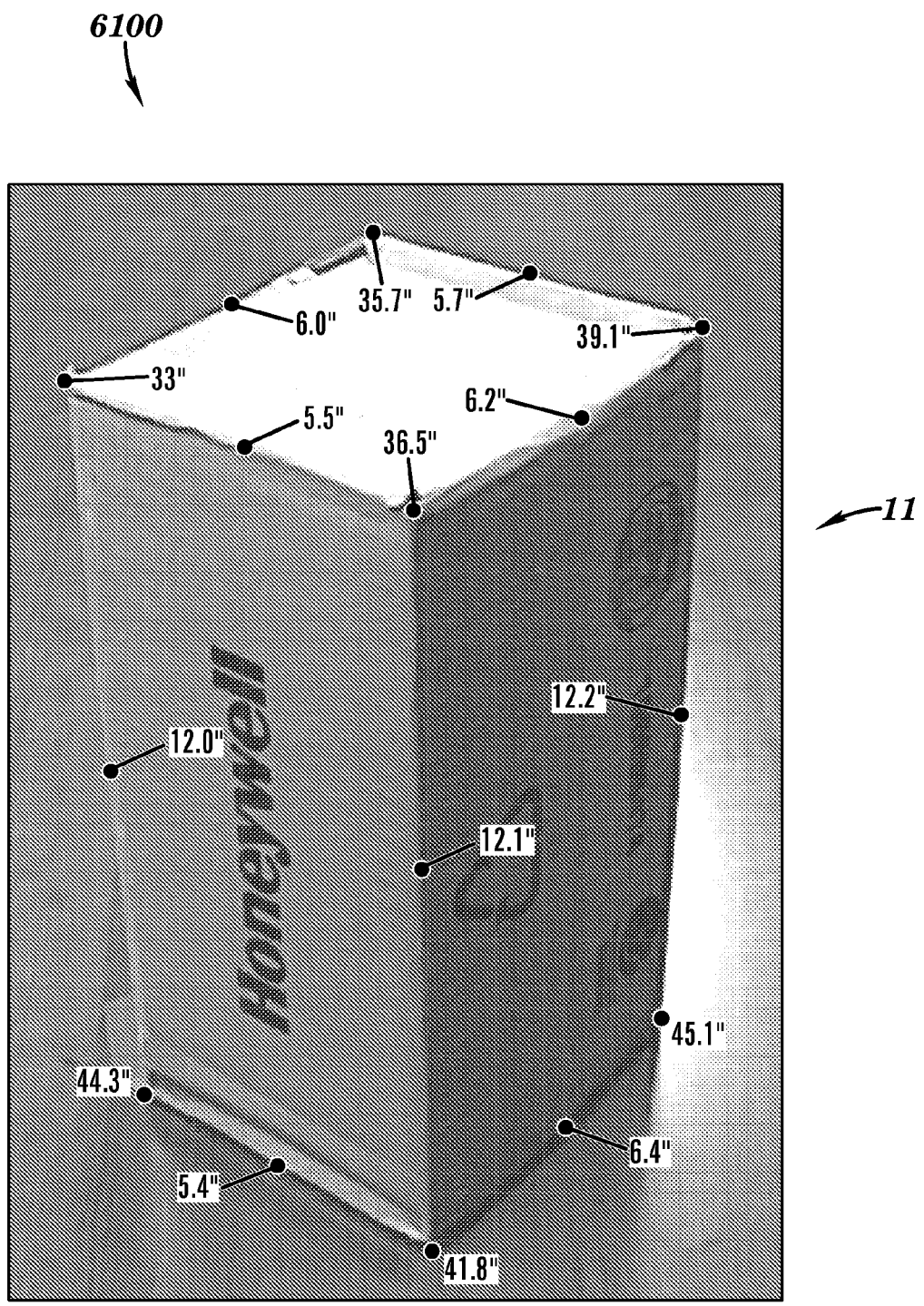
FIG. 27 is rendered image of the object of FIG. 26.

For example, using suitable processing points A1, A2, A3, etc. may be located, or estimated, such as first determining edges of the object due to contrasts and then determining the intersection for the edges. The points or corners may be selected and rendered images generated, via offset shift or Fourier slice refocusing. The rendered image may be readily correlated to a distance from the terminal camera. Based on the distance, and if an edge of the object is aligned with the rendered image then a correlation exists between the length of the edge of the object and the corresponding length of the edge in the plenoptic image or on the image sensor array. Lengths of angled edges may be determined by the location of the ends of the edges and the distances to the different rendered images. FIG. 27 illustrates a rendered image 6100 of object 11 with distance dimensions from the imagining terminal displayed or superimposed adjacent to the some of the corners of the object. In addition, the length of the edges is identified along the sides of the edges. Various approaches may determine or approximate the coordinates per point (x,y, z) and/or in polar (r, theta, phi), and thus, the box dimensions. For example, each of 4 points or corners may be determined to be in the same plane (e.g., by approximation), or used in generating information regarding surfaces not observed in the image.

The above indicia reading terminals and imaging terminals may be further understood in connection with the following in accordance with aspects of the present disclosure. For example, light-field, or radiance capturing, or plenoptic imaging subsystems sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field imaging systems capture radiance so that light-field images originally taken out-of-focus may be refocused, noise may be reduced, viewpoints may be changed, and other light-field effects may be achieved.

The radiance capturing system may employ a single objective lens and a microlens or lenslet array that includes, for example, about 100,000 lenslets. In this configuration, the lenslet array is fixed at a small distance (about 0.5 mm) from the image sensor array, e.g. a charge-coupled device (CCD) or complementary metal-oxide-semiconductor (CMOS). The microlenses are placed and adjusted accurately to be exactly at one focal length f from the image sensor array. This is done by placing the array of microlenses at distance f from the sensor, where f is the focal length of the microlenses. For example, for the microlenses, f may be chosen to be equal to the distance to the image sensor array. In other words, the microlenses may be focused on infinity, which is essentially equivalent to focusing the microlenses on the main lens, given the large distance of the microlenses to the main lens relative to the focal length of the microlenses. Thus, the raw plenoptic image captured is made up of an array of small images, typically circular, of the main lens. These small images may be referred to as sub-images, microimages, or microlens images. Each microlens does not create an image of the internal world on the image sensor array, but instead creates an image of the main camera lens.

The lenslet array enables capture of the light-field, i.e. to record not only image intensity, but also the distribution of intensity in different directions at each point. Each lenslet splits a beam coming to it from the main lens into rays coming from different locations on the aperture of the main lens. Each of these rays is recorded as a pixel on the image sensor array, and the pixels under each lenslet collectively form an n-pixel image. This n-pixel area under each lenslet may be referred to as a sub-aperture image or macropixel so that a microimage is generated or obtained at each macropixel. The plenoptic image captured, for example, with 100,000 lenslets will contain 100,000 macropixels, and thus generate 100,000 microimages of a subject or field of interest. Each macropixel contains different angular samples of the light rays coming to a given microlens. Each macropixel contributes to only one pixel in the different angular views of the scene; that is, only one pixel from a macropixel is used in a given angular view. As a result, each angular view contains 100,000 pixels, each pixel contributed from a different macropixel. Another type of integral or light-field technique is similar to the above, except that an array of pinholes is used between the main lens and the image sensor array instead of an array of lenslets.

With reference again to the microlens array configuration, the microlens-space system swaps positional and angular coordinates of the radiance at the microlens. Optical analysis of such a plenoptic imaging system considers it as a cascade of a main lens system followed by a microlens system. The basic operation of the cascade system is as follows. Rays focused by the main lens are separated by the microlenses and captured on the image sensor array. At their point of intersection, the rays have the same position but different slopes. This difference in slopes causes the separation of the rays when they pass through a microlens-space system. In more detail, each microlens functions to swap the positional and angular coordinates of the radiance, then this new positional information is captured by the image sensor array. Because of the swap, it represents the angular information at the microlens. As a result, each microlens image captured by the image sensor array represents the angular information for the radiance at the position of the optical axis of the corresponding microlens.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image sensor technology, on the other hand, is only two-dimensional, and light-field imagery must therefore be captured and represented in flat (two dimensional) form. A variety of techniques have been developed to transform and capture the 4D radiance in a manner compatible with 2D sensor technology. This may be referred to as a flat representation of the 4D radiance (or light-field), or simply as a flat.

There are various embodiments of methods and apparatus for rendering high-resolution images from a light-field, for example captured by embodiments of the focused plenoptic image subsystem. For example, methods for rendering high-resolution images from the light-field may be referred to as a full-resolution light-field rendering method. The light-field rendering method may be referred to as full-resolution because the method makes full use of both positional and angular information available in the captured radiance data. The full-resolution light-field rendering method may be implemented as or in a tool, module, library function, plug-in, stand-alone application, etc. For simplicity, implementations of embodiments of the full-resolution light-field rendering method may be referred to as a rendering module. Alternatively, or in addition, other light-field rendering or processing techniques may be applied to captured flats by a rendering module, and/or by other modules.

Scanning of Multiple Objects having Decodable Indicia

From the present description, it will be appreciated that the technique of the present disclosure may be employed in reading objects on a conveyor. For example, various size objects having decodable indicia may pass one or more indicia reading terminals of the present disclosure. Due to the different size boxes, the decodable indicia attached thereto will be at different distances or planes from the front of the indicia reading terminal. Each scan of the indicia reading terminal may read a decodable indicia attached to an object, or each scan of the indicia reading terminal may read a plurality of boxes and the plurality of decodable indicia attached thereto. In both situations, the plenoptic image data may be used for decoding the decodable indicia disposed at different distances from the indicia reading terminal, or used for decoding a plurality of different decodable indicia disposed at different distances in a single scan as described in greater detail above. For example, the decodable indicia may be scanned without any aiming or focusing action, the full light field image data stored in the RAM, the software program operably auto selects different focus point and distance parameters, to pick up different image data from the full light field image data which is then sent to the image data to decoder. With the image data, the decoder can output the barcode result and location information, software can handle the barcode result with location information.

In addition, a prime functionality offered by plenoptic imaging is the ability to capture, in a single image, a defined field of view containing objects at a range of focus distances or depths from the imaging optics, and then, using software, processing of the captured image to focus on any given plane within that field. In another example, it is possible to capturing multiple similar objects, e.g., batch scanning, For example, barcodes, or other decodable indicia may be offset from one another in a z-axis (away from the indicia reading terminal, and at least one of the x-axis and y-axis relative to the plane of the sensor. With this understanding, applications include tunnel scanning, e.g., wherein the imaging terminal is offset from the direction in which the object s such as goods are travelling along a linear belt so that the imaging terminal can capture multiple barcodes at a time.

Other applications include package sortation or sorting, e.g., wherein the imaging terminal is offset from the direction in which the objects such as goods are travelling along a linear belt so that the imaging terminal can capture multiple barcodes at a time, and based on the decoded barcodes, appropriately sorting or directing the packages.

Further applications include capturing multiple but dissimilar objects, e.g., comparative scanning For example, two or more objects in the field of view may be compared for correlation. One approach may be an indicia of admission, such as an ID badge hanging around a person's neck, or a badge or smartphone display held up to a scanner, which is then correlated with the face or retina of the person presenting the indicia. This could be done at the time of the scan, or used later if there were a question of identity or proper access. The initial scan may be used only to decode the indicia, the image is stored, and can be processed later to focus on the person presenting the indicia.

Another approach may include irregularly packaged goods by correlating a barcode or other indicia that is in one plane of the packaging, with object recognition data in another plane such as product/manufacturer name, logo, trade dress, or SKU, to ensure a match. A desired use may be to prevent the barcode from a lower-cost good being applied to the purchase of a higher-priced one.

Another approach may involve inventory, to correlate the shelf tag to the shelved items. After imaging a section of shelving, the system may resolve the shelf tag, decode the information it contains (e.g., via barcode or OCR), focus on an item on the shelf behind the tag, and use a barcode on the item, character recognition of printing on the item, or object recognition of the overall item to identify the product, and cross-check the shelf tag information against the item information.

Another approach may involve decoding indicia offset from the imaging plane to present or overcome substantial perspective distortion, such that the near and far ends of the indicia were in significantly different planes or curved surfaces. For example, by operably refocusing appropriate portions of the plenoptic mage.

In another example, there is no need to focus images before capturing them and instead record the light field, and instead subsequent digital refocusing, digital correction of lens aberrations, and software manipulation algorithms allows for obtaining rendered images for decoding.

From the present description, it will be appreciated that the various aspects of the present technique for imaging decodable images may overcome problems in conventional indicia reading terminals. For example, the present technique may provide advantages over barcode scanners having fixed focused optical systems or systems having mechanical zooming to adjust the focal distances when capturing bar codes or images. Mechanical zooming mechanisms may be costly to implement, have performance issues, and may also have decreased reliability. The present technique may overcome the problem of imaging the decodable indicia out of focus which leads to unsuccessful decode attempts, avoids the need for indicia reading terminals having autofocus or manual focus capabilities and the associated components therewith, and avoids the need for aiming the indicia reading terminal or placing the decodable indicia in the center and/or at a specific distance from the indicia reading terminal since recording the entire light field allows refocusing.

Additional benefits of the present technique may include increased product robustness and reliability such as no moving parts, lower product hardware cost, and potentially ability to offer a smaller package size.

With reference again to FIGS. 4 and 25, terminals 1000, 1001, 1002, and 5000, may include an image sensor 1032 comprising multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling, e.g., the exposure period of image sensor 1032, gain applied to the amplifier 1036, etc. The noted circuit components 1032, 1036, 1037, and 1038 can be packaged into a common image sensor integrated circuit 1040. Image sensor integrated circuit 1040 can incorporate fewer than the noted number of components. Image sensor integrated circuit 1040 including image sensor array 1033 and imaging lens assembly 200 can be incorporated in a hand held housing.

In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 can alternatively, prior to subjecting a frame for further processing interpolate pixel values intermediate of blue pixel positions utilizing blue pixel values. An imaging subsystem of terminals 1000 and 5000 and can include image sensor 1032 and plenoptic lens assembly 200 for projecting a plenoptic image onto image sensor array 1033 of image sensor 1032.

In the course of operation of the terminals, image signals can be read out of image sensor 1032, converted, and stored into a system memory such as RAM 1080. Memory 1085 of the terminals can include RAM 1080, a nonvolatile memory such as EPROM 1082 and a storage memory device 1084 such as may be provided by a flash memory or a hard drive memory. In one embodiment, the terminals can include processor 1060 which can be adapted to read out image data stored in memory 1080 and subject such image data to various image processing algorithms. The terminals can include a direct memory access unit (DMA) 1070 for routing image information read out from image sensor 1032 that has been subject to conversion to RAM 1080. In another embodiment, the terminals can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the disclosure.

Reference still to FIGS. 4 and 25 and referring to further aspects of the terminals, imaging lens assembly 200 can be adapted for projecting an image of decodable indicia 15 located within a light field or space S (FIG. 1) onto image sensor array 1033.

The terminals may include illumination subsystem 800 for illumination of target, and projection of illumination pattern 1260. Illumination pattern 1260, in the embodiment shown can be projected to be proximate to but larger than an area defined by field of view 1240, but can also be projected in an area smaller than an area defined by a field of view 1240. Illumination subsystem 800 can include a light source bank 500, comprising one or more light sources. Light source assembly 800 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

The terminals can also include an aiming subsystem 600 for projecting an aiming pattern (not shown). Aiming subsystem 600 which can comprise a light source bank can be coupled to aiming light source bank power input unit 1208 for providing electrical power to a light source bank of aiming subsystem 600. Power input unit 1208 can be coupled to system bus 1500 via interface 1108 for communication with processor 1060.

In one embodiment, illumination subsystem 800 may include, in addition to light source bank 500, an illumination lens assembly 300. In addition to or in place of illumination lens assembly 300, illumination subsystem 800 can include alternative light shaping optics, e.g. one or more diffusers, mirrors, and prisms. In use, the terminals, such as terminals 1000, 1001, and 1002 can be oriented by an operator with respect to a target, (e.g., a piece of paper, a package, another type of substrate, screen, etc.) bearing decodable indicia 15 in such manner that illumination pattern 1260 is projected on decodable indicia 15. In the example of FIG. 1, decodable indicia 15 is provided by a 1D barcode symbol. Decodable indicia 15 could also be provided by a 2D barcode symbol or optical character recognition (OCR) characters. A light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, the terminals can include a power supply 1402 that supplies power to a power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410.

Further, regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

The terminals can also include a number of peripheral devices including, for example, a trigger 1220 which may be used to make active a trigger signal for activating frame readout and/or certain decoding processes. The terminals can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a barcode symbol, e.g., a one dimensional barcode symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D barcode symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

The terminals can include various interface circuits for coupling various peripheral devices to system address/data bus (system bus) 1500, for communication with processor 1060 also coupled to system bus 1500. The terminals can include an interface circuit 1028 for coupling image sensor timing and control circuit 1038 to system bus 1500, an interface circuit 1106 for coupling illumination light source bank power input unit 1206 to system bus 1500, and an interface circuit 1120 for coupling trigger 1220 to system bus 1500. The terminals can also include display 1222 coupled to system bus 1500 and in communication with processor 1060, via an interface 1122, as well as pointer mechanism 1224 in communication with processor 1060 via an interface 1124 connected to system bus 1500. The terminals can also include keyboard 1226 coupled to systems bus 1500 and in communication with processor 1060 via an interface 1126. The terminals can also include range detector unit 1210 coupled to system bus 1500 via interface 1110. In one embodiment, range detector unit 1210 can be an acoustic range detector unit. Various interface circuits of the terminals can share circuit components. For example, a common microcontroller providing control inputs to circuit 1038 and to power input unit 1206 can be provided to coordinate timing between image sensor array controls and illumination subsystem controls.

A succession of frames of image data that can be captured and subject to the described processing can be full frames (including pixel values corresponding to each pixel of image sensor array 1033 or a maximum number of pixels read out from image sensor array 1033 during operation of the terminals). A succession of frames of image data that can be captured and subject to the described processing can also be "windowed frames" comprising pixel values corresponding to less than a full frame of pixels of image sensor array 1033. A succession of frames of image data that can be captured and subject to the above described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels or ranges of pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

The terminals can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

Figure 28:
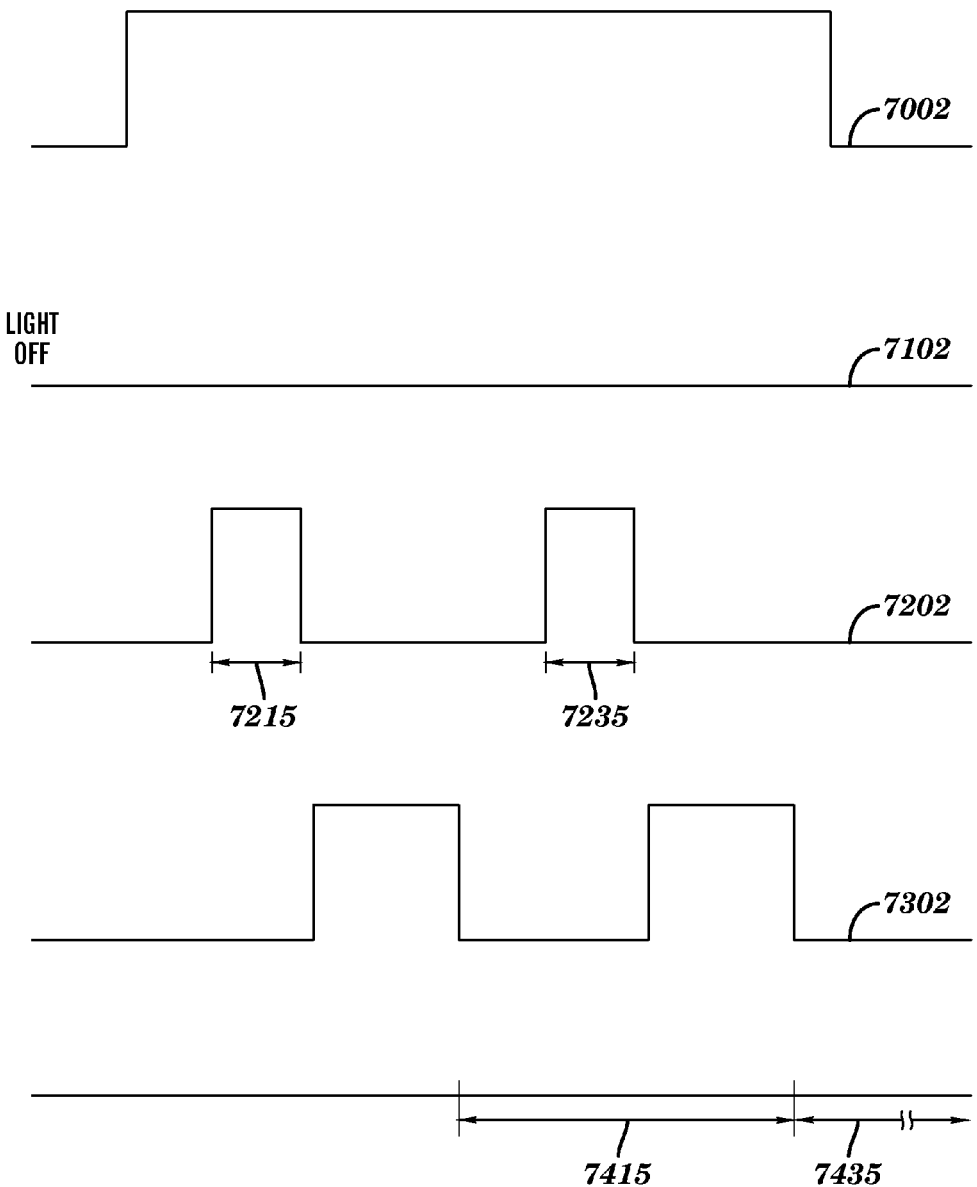
FIGS. 28 and 29 are timing diagrams illustrating embodiments operable for decoding a representation of decodable indicia using the indicia reading terminal of FIG. 1.
Figure 29:
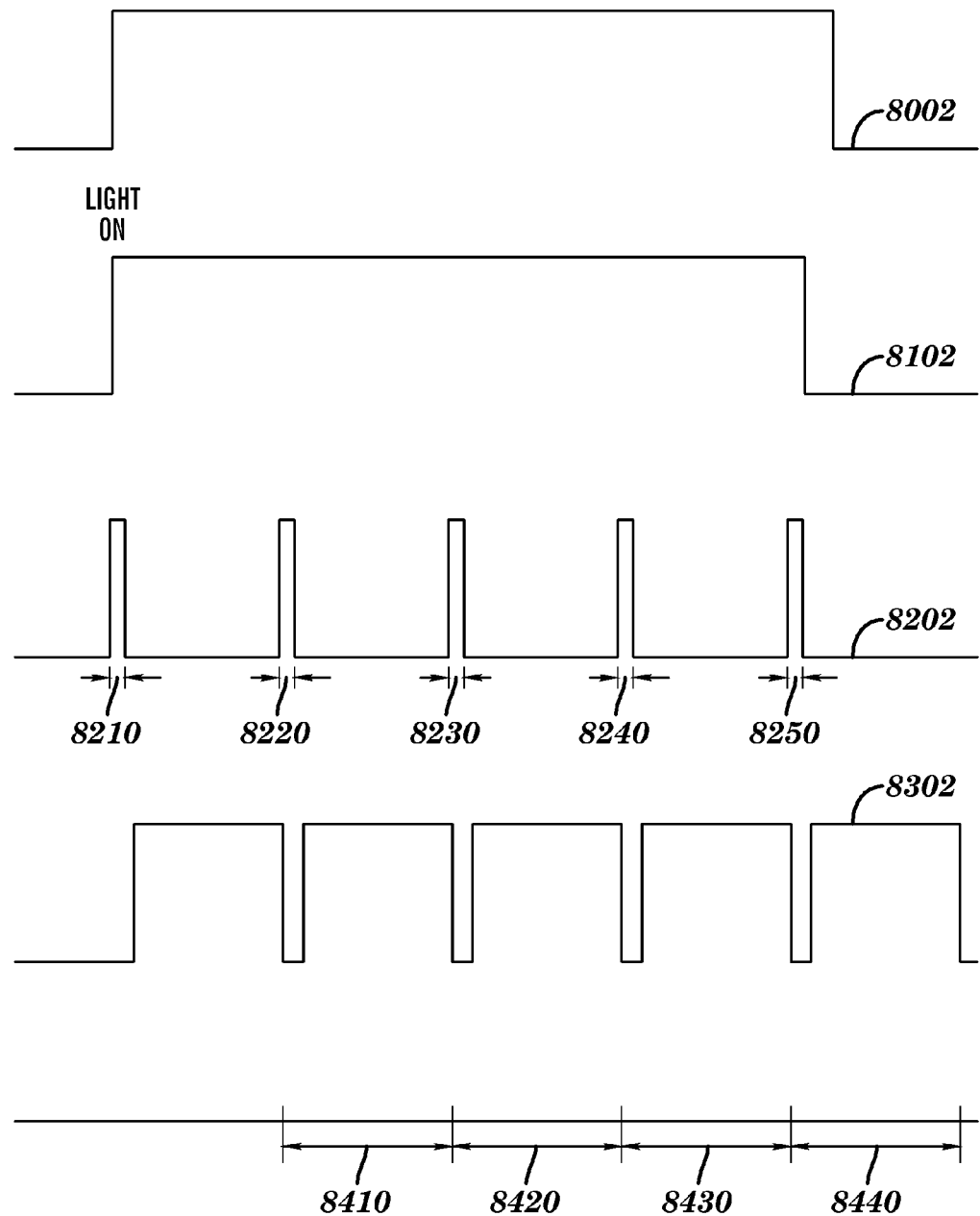

FIGS. 28 and 29 illustrate two timing diagrams in connection with operation of the terminals. For example, the terminal may be operable so that no illumination is provided as shown in FIG. 28 such as for imaging a decodable indicia on a non-illuminated substrate, where a decodable indicia is displayed on a backlit display, or imaging an object for dimensioning where sufficient light is present. The terminals may also be operable so that illumination is provided as shown in FIG. 29 such as for imaging a decodable indicia on a non-illuminated substrate, or imaging an object for dimensioning where insufficient light is present. Terminal 5000 may operate according to the timing diagrams for obtaining images and may be provided with or without decoding capabilities.

With regard to FIG. 28, the timing diagram of FIG. 28 may be employed for when a decodable indicia having a backlit display is detected or where sufficient ambient light is present. For example, a signal 7002 is a trigger signal which can be made active by actuation of trigger 1220 (FIGS. 1-3 and 24), and which can be deactivated by releasing of trigger 1220 (FIGS. 1-3 and 24). A trigger signal may also become inactive after a time out period or after a successful decode of a decodable indicia.

Signal 7102 illustrates illumination subsystem 800 (FIGS. 4 and 25) having an inactive energization level, e.g., illustrating illumination or light not being turned on. A signal 7202 is an exposure control signal illustrating active states defining exposure periods and inactive states intermediate the exposure periods for the image sensor of the terminal. For example, in an active state, an image sensor array of the terminals is sensitive to light incident thereon. Exposure control signal 7202 can be applied to an image sensor array of the terminals so that pixels of an image sensor array are sensitive to light during active periods of the exposure control signal and not sensitive to light during inactive periods thereof. During exposure periods 7215 and 7235, the image sensor array of the terminals is sensitive to light incident thereon while the illumination subsystem is inactive, e.g., the illumination subsystem is off.

A signal 7302 is a readout control signal illustrating the light level information contained in the exposed pixels in the image sensor array being transferred to memory or secondary storage in the imager so that the imager may be operable to being ready for the next active portion of the exposure control signal. In the timing diagram of FIG. 28, periods 7415 and 7435 are periods in which processor 1060 (FIGS. 4 and 25) can process one or more frames of image data. For example, periods 7415 and 7435 may correspond to one or more attempts to decode decodable indicia in which the image resulted during periods when indicia reading terminal 1000, 1002, and 1003 (FIGS. 1-3) was not illuminating the decodable indicia, or correspond to one or more attempts to determine an object dimension in which the image resulted during periods when imaging terminal 5000 (FIG. 5) was not illuminating the object.

With reference to FIG. 29, the timing diagram of FIG. 29 may be employed for when a decodable indicia disposed on a non-illuminated substrate, or imaging an object for dimensioning in insufficient ambient light. For example, a signal 6002 is a trigger signal which can be made active by actuation of trigger 1220 (FIGS. 1-3 and 24), and which can be deactivated by releasing of trigger 1220 (FIGS. 1-3 and 24). A trigger signal may also become inactive after a time out period or after a successful decode of a decodable indicia, or dimensioning of an object.

Signal 8102 illustrates illumination subsystem 800 (FIGS. 4 and 25) having an active energization level, e.g., illustrating illumination or light being turned on. A signal 8202 is an exposure control signal illustrating active states defining exposure periods and inactive states intermediate the exposure periods for an image sensor of a terminal. For example, in an active state, an image sensor array of the terminals is sensitive to light incident thereon. Exposure control signal 8202 can be applied to an image sensor array of the terminal so that pixels of an image sensor array are sensitive to light during active periods of the exposure control signal and not sensitive to light during inactive periods thereof. During exposure periods 8210, 8220, 8230, and 8240, the image sensor array of the terminals is sensitive to light incident thereon.

A signal 8302 is a readout control signal illustrating the light level information contained in the exposed pixels in the image sensor array being transferred to memory or secondary storage in the imager so that the imager may be operable to being ready for the next active portion of the exposure control signal. In the timing diagram of FIG. 29, periods 8410, 8420, 8430, 8440, and 8450 are periods in which processer 1060 (FIGS. 4 and 25) may process one or more frames of mage data when indicia reading the terminals was illuminating the decodable indicia or the object for dimensioning.

A1. An indicia reading terminal for decoding decodable indicia, said indicia reading terminal comprising: a plenoptic imaging subsystem comprising an image sensor array and plenoptic imaging optics operable to project a plenoptic image of a space containing the decodable indicia onto said image sensor array; a hand held housing encapsulating a least a portion of said plenoptic imaging subsystem; a trigger disposed on said hand held housing; an illumination source for projecting illumination onto the decodable indicia; an aimer for projecting an aimer pattern onto the decodable indicia; said indicia reading terminal operable, responsive to detecting that said trigger has been actuated by an operator, to obtain plenoptic image data from said image sensor array; said indicia reading terminal operable to obtain first rendered image data based on at least a portion of the plenoptic image data; and said indicia reading terminal operable to attempt to decode the decodable indicia represented in the rendered image data. A2. The indicia reading terminal of A1 wherein, if the first attempt to decode is not successful, said indicia reading terminal being operable to obtain second rendered image data based on at least a portion of the plenoptic image data, which second rendered image data being different from the first rendered image data, and operable to attempt to decode the decodable indicia represented in the second rendered image. A3. The indicia reading terminal of A1 wherein indicia reading terminal is operable to sequentially obtain and attempt to decode the decodable indicia represented in the rendered first image data, prior to or while obtaining a subsequent rendered image. A4. The indicia reading terminal of A1 wherein the first rendered image data is based on Fourier slice refocusing. A5. The indicia reading terminal of A1 wherein the first rendered image data is based on a first offset shift, and the second rendered image data is based on a second offset shift different from said first offset shift. A6. The indicia reading terminal of A1 wherein the first rendered image is based on a plurality of different sub-aperture images obtained from the plenoptic image data, and wherein the different sub-aperture images are obtained having at least one of a randomly selected offset shift and a predetermined offset shift. A7. The indicia reading terminal of A1 wherein the first rendered image is based on a plurality of different sub-aperture images obtained from the plenoptic image data, and wherein the different sub-aperture images are obtained having a predetermined offset shift corresponding to rendering the decodable indicia disposed at a predetermined distance from the indicia reading terminal. A8. The indicia reading terminal of A1 wherein the rendered image is based on at least one of randomly selected common portions of sub-images of the plenoptic image, and predetermined selected common portions of sub-images of the plenoptic image. A9. The indicia reading terminal of A1 wherein said indicia reading terminal is operable to determine at least a portion of a boundary of the representation of the decodable indicia in the plenoptic image data, and the rendered image is based on the decodable indicia disposed within the portion of the boundary. A10. The indicia reading terminal of A1 wherein the rendered image is operably selected to correspond to a rendered portion based on the aimer pattern. A11. The indicia reading terminal of A1 wherein said plenoptic imaging subsystem comprises at least one filter, and said filter being operable to pass illumination reflected from said decodable indicia, while inhibiting at least some of ambient light reflected off said decodable indicia. A12. The indicia reading terminal of A1 wherein said indicia reading terminal is operable to remove specular reflection in at least one of plenoptic image data and the rendered image and wherein said indicia reading terminal being operable to attempt to decode the decodable indicia comprises said indicia reading terminal being operable to attempt to decode the decodable indicia using the corrected rendered image. A13. The indicia reading terminal of A1 wherein the rendered image is based on at least one of a distance measurement to the decodable indicia, and a sharpness value. A14. The indicia reading terminal of A1 wherein said indicia reading terminal being operable to attempt to decode the decodable indicia comprising a plurality of decodable indicia using a plurality of different rendered images. A15. The indicia reading terminal of A1 wherein said indicia reading terminal comprises a multi-core processor, and wherein said indicia reading terminal being operable to attempt to generally simultaneously obtain a plurality of different rendered images using separate cores for different ones of the plurality of different rendered images. A16. The indicia reading terminal of A1 wherein said indicia reading terminal comprises a multi-core processor, and wherein said indicia reading terminal being operable to attempt to generally simultaneously decode the decodable indicia comprising a plurality of decodable indicia using a plurality of different rendered images processed by different ones of the multi-core processor. A17. The indicia reading terminal of A1 wherein said indicia reading terminal being operable to attempt to decode the decodable indicia represented in the rendered image comprises said indicia reading terminal operable to automatically discriminate from a plurality of different decodable indicia having different symbologies. A18. The indicia reading terminal of A1 wherein said indicia reading terminal being operable to attempt to decode the decodable indicia represented in the plenoptic image data without rendering. A19. The indicia reading terminal of A1 wherein the rendered image comprises a rendered image with generally the entire space being in focus, and said indicia reading terminal being operable to attempt to decode the decodable indicia using the rendered image of the generally entire space being in focus. A20. The indicia reading terminal of A1 wherein said indicia reading terminal operable to obtain the rendered image and decode the representation of the decodable indicia in the rendered image remotely from said hand held housing. A21. The indicia reading terminal of A1 wherein the plenoptic image data comprises a portion of the space containing the decodable indicia projected onto said image sensor array. A22. The indicia reading terminal of A21 wherein the portion of the space containing the decodable indicia onto said image sensor array comprises at least one of: a center portion of the plenoptic image projected onto the image sensor array; and an elongated center portion of the plenoptic image projected onto and across the image sensor array. A23. The indicia reading terminal of A1 wherein said indicia reading terminal being operable to obtain the rendered image based on the at least a portion of the plenoptic image data, comprises obtaining the rendered image corresponding to at least one of: a portion of the plenoptic image data corresponding to a center portion of the plenoptic image projected onto the image sensor array; and a portion of the plenoptic image data corresponding to an elongated center portion of the plenoptic image projected onto and across the image sensor array. A24. The indicia reading terminal of A1 wherein said indicia reading terminal is operable to determine at least one physical dimension of an object attached to the decodable indicia based on at least one rendered image. A25. The indicia reading terminal of A1 wherein imaging optics assembly comprises at least one of an array of microlenses and a mask.

B1. A method for decoding decodable indicia, the method comprising: obtaining a first plenoptic image data corresponding to a space containing the decodable indicia from an image sensor array of a hand held indicia reading terminal in responsive to detecting that a trigger has been actuated by an operator, to obtain plenoptic image data from said image sensor array; obtaining a first rendered image based on at least a portion of the plenoptic image data; and attempting a decode of the decodable indicia represented in the first rendered image.

C1. An indicia reading terminal for decoding decodable indicia, said indicia reading terminal comprising: a plenoptic imaging subsystem comprising an image sensor array and plenoptic imaging optics operable to project a first plenoptic image of a space containing the decodable indicia onto said image sensor array; a hand held housing encapsulating a least a portion of said plenoptic imaging subsystem; a trigger disposed on said hand held housing; an illumination source for projecting illumination onto the decodable indicia; an aimer for projecting an aimer pattern onto the decodable indicia; said indicia reading terminal operable, responsive to detecting that said trigger has been actuated by an operator, to obtain first plenoptic image data from said image sensor array; said indicia reading terminal operable to adjust at least one operating parameter of the indicia reading terminal based on said first plenoptic image data; said indicia reading terminal operable to project a second plenoptic image of the space containing the decodable indicia onto said image sensor array; said indicia reading terminal operable to obtain a first rendered image based on at least a portion of the second plenoptic image data; and said indicia reading terminal operable to attempt to decode the decodable indicia represented in the first rendered image. C2. The indicia reading terminal of C1 wherein said indicia reading terminal being operable to adjust the at least one operating parameter comprises said indicia reading terminal operable to adjust an exposure period of said image sensor array. C3. The indicia reading terminal of C1 wherein said indicia reading terminal being operable to adjust the at least one operating parameter comprises said indicia reading terminal operable to adjust operation of said illumination subsystem for projecting illumination onto the decodable indicia. C4. The indicia reading terminal of C3 wherein said indicia reading terminal being operable to adjust the at least one operating parameter comprises said indicia reading terminal operable to adjust an exposure period of said image sensor array and adjust operation of said illumination subsystem for projecting illumination onto the decodable indicia. C5. The indicia reading terminal of C1 wherein said indicia reading terminal being operable to adjust the at least one operating parameter comprises said indicia reading terminal operable to adjust a gain of the plenoptic image signals read out of the image sensor array. C6. The indicia reading terminal of C1 wherein the first rendered image data is based on at least one of Fourier slice refocusing and a offsetting shift of sub-aperture images. C7. The indicia reading terminal of C1 wherein said indicia reading terminal being operable to adjust the at least one operating parameter comprises said indicia reading terminal operable to adjust the at least one operating parameter of the indicia reading terminal based on a portion of said first plenoptic image data. C8. The indicia reading terminal of C7 wherein the portion of said first plenoptic image data corresponds to generally a center portion of the projected plenoptic image. C9. The indicia reading terminal of C7 wherein the portion of said first plenoptic image data corresponds to at least one of a randomly selected portion of the projected plenoptic image and a predetermined selected portion of the projected plenoptic image. C10. The indicia reading terminal of C1 wherein said indicia reading terminal is operable to determine a portion of a boundary of the decodable indicia, and wherein the portion of said first plenoptic image data corresponds to the decodable indicia disposed within the portion of the boundary. C11. The indicia reading terminal of C1 wherein said indicia reading terminal is operable to determine portions of boundaries of a plurality of decodable indicia, and wherein the portion of said first plenoptic image data corresponds to the decodable indicia disposed within the portions of the boundaries. C12. The indicia reading terminal of C1 wherein said indicia reading terminal being operable to adjust the at least one operating parameter comprises said indicia reading terminal operable to adjust the at least one operating parameter based on the plenoptic image data without obtaining a rendered image. C13. The indicia reading terminal of C1 wherein said indicia reading terminal being operable to adjust at least one operating parameter based on the first rendered image. C14. The indicia reading terminal of C1 wherein, if the first attempt to decode is not successful, said indicia reading terminal being operable to obtain a second rendered image based on the second plenoptic image data, and operable to attempt to decode the decodable indicia represented in the second rendered image based on the second rendered image. C15. The indicia reading terminal of C1 wherein the rendered image is operably selected to correspond to a rendered portion based on the aimer pattern. C16. The indicia reading terminal of C1 wherein said indicia reading terminal comprises a multi-core processor, and wherein said indicia reading terminal being operable to attempt to generally simultaneously decode the decodable indicia comprising a plurality of decodable indicia using a plurality of different rendered images processed by different ones of the multi-core processor. C17. The indicia reading terminal of C1 wherein said indicia reading terminal being operable to attempt to decode the decodable indicia represented in the rendered image comprises said indicia reading terminal operable to automatically discriminate from a plurality of different decodable indicia having different symbologies. C18. The indicia reading terminal of C1 wherein said indicia reading terminal being operable to attempt to decode the decodable indicia represented in the plenoptic image data without rendering. C19. The indicia reading terminal of C1 wherein the rendered image comprises obtaining the first rendered image with generally the entire space being in focus, and said indicia reading terminal being operable to attempt to decode the decodable indicia using the first rendered image of the generally entire space being in focus. C20. The indicia reading terminal of C1 wherein said indicia reading terminal operable to obtain the first rendered image and decode the representation of the decodable indicia in the rendered image remotely from said hand held housing. C21. The indicia reading terminal of C1 wherein the plenoptic image data comprises a portion of the space containing the decodable indicia projected onto said image sensor array. C22. The indicia reading terminal of C1 wherein the portion of the space containing the decodable indicia onto said image sensor array comprises at least one of: a center portion of the plenoptic image projected onto the image sensor array; and an elongated center portion of the plenoptic image projected onto and across the image sensor array. C23. The indicia reading terminal of C1 wherein said indicia reading terminal being operable to obtain the rendered image based on the at least a portion of the plenoptic image data, comprises obtaining the rendered image corresponding to at least one of: a portion of the plenoptic image data corresponding to a center portion of the plenoptic image projected onto the image sensor array; and a portion of the plenoptic image data corresponding to an elongated center portion of the plenoptic image projected onto and across the image sensor array. C24. The indicia reading terminal of C1 wherein said indicia reading terminal is operable to determine at least one physical dimension of an object attached to the decodable indicia based on at least one rendered image. C25. The indicia reading terminal of C1 wherein imaging optics assembly comprises at least one of an array of microlenses and a mask.

D1. A method for decoding decodable indicia, the method comprising: obtaining a first plenoptic image data corresponding to a space containing the decodable indicia from an image sensor array of an indicia reading terminal; adjusting at least one operating parameter of the indicia reading terminal based on said first plenoptic image data; obtaining a second plenoptic image data corresponding to the space containing the decodable indicia from the image sensor array of the indicia reading terminal; obtaining a first rendered image based on at least a portion of the second plenoptic image data; and attempting a decode of the decodable indicia represented in the first rendered image.

E1. A terminal for measuring at least one dimension of an object, the terminal comprising: a plenoptic imaging subsystem comprising an image sensor array and plenoptic imaging optics operable to project a plenoptic image of a space containing the decodable indicia onto said image sensor array; said terminal operable to obtain plenoptic image data of the object from said image sensor array; and said terminal operable to determine at least one of a height, a width, and a depth dimension of the object based on at least a portion of the plenoptic image data. E2. The terminal of E1 wherein said terminal operable to determine the at least one of the height, the width, and the depth dimension of the object comprises said terminal operable to determine the height, the width, and the depth dimension of the object based on obtaining at least one rendered image from the plenoptic image data. E3. The terminal of E1 wherein said terminal operable to determine the at least one of the height, the width, and the depth dimension of the object comprises said terminal operable to determine the at least one of the height, the width, and the depth dimension of the object based on determining at least one distances from the terminal to the object based on the plenoptic image data. E4. The terminal of E1 wherein said terminal comprises a multi-core processor, and wherein said terminal being operable to attempt to determine the at least one of the height, the width, and the depth dimension of the object comprises using different portions of the selected portion of the plenoptic image data processed by different ones of the multi-core processor. E5. The terminal of E1 wherein imaging optics assembly comprises at least one of an array of microlenses and a mask. E6. The terminal of E1 wherein said terminal is operable to determine the height, the width, and the depth dimensions of the object based on operation of said terminal directed from a single direction relative to said object. E7. The terminal of E1 wherein said terminal is operable to determine at least two of the height, the width, and the depth dimensions of the object based on operation of said terminal directed from at least two orthogonal directions relative to said object. E8. The terminal of claim E7 wherein said terminal operable for decoding a decodable indicia associated with the object. E9. The terminal of E1 wherein said terminal comprises a hand held terminal.

It is to be understood that the above description is intended to be illustrative, and not restrictive. For example, the above-described embodiments and/or aspects thereof may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An indicia reading terminal, comprising:
    a plenoptic imaging subsystem comprising an image sensor array and plenoptic imaging optics operable to project a first plenoptic image of a space containing a decodable indicia onto the image sensor array;
    an illumination source for projecting illumination onto the decodable indicia;
    wherein the indicia reading terminal is operable to:
        obtain first plenoptic image data from the image sensor array;
        adjust at least one operating parameter of the indicia reading terminal based on the first plenoptic image data;
        project a second plenoptic image of the space containing the decodable indicia onto the image sensor array;
        obtain a first rendered image based on at least a portion of the second plenoptic image data; and
        attempt to decode the decodable indicia represented in the first rendered image;
    wherein the at least one operating parameter comprises:
        an exposure period of the image sensor array;
        operation of the illumination subsystem for projecting illumination onto the decodable indicia;
        an exposure period of the image sensor array and operation of the illumination subsystem for projecting illumination onto the decodable indicia;
        a gain of the plenoptic image signals read out of the image sensor array; and/or
        a frame rate at which the indicia reading terminal captures frames of image data.

2. The indicia reading terminal of claim 1, wherein the first rendered image data is based on at least one of Fourier slice refocusing and an offsetting shift of sub-aperture images.

3. The indicia reading terminal of claim 1, wherein a portion of the first plenoptic image data corresponds to at least one of generally a center portion of the projected plenoptic image, a randomly selected portion of the projected plenoptic image, and a predetermined selected portion of the projected plenoptic image.

4. The indicia reading terminal of claim 1, wherein:
    the indicia reading terminal is operable to determine a portion of the boundaries of one or more decodable indicia; and
    a portion of the first plenoptic image data corresponds to the decodable indicia disposed within the portion of the boundaries.

5. The indicia reading terminal of claim 1, wherein the indicia reading terminal is operable to, if the attempt to decode is not successful, obtain a second rendered image based on the second plenoptic image data and attempt to decode the decodable indicia represented in the second rendered image.

6. The indicia reading terminal of claim 1, comprising a multi-core processor, wherein the indicia reading terminal is operable to attempt to simultaneously decode a plurality of decodable indicia using a plurality of different rendered images processed by different cores of the multi-core processor.

7. The indicia reading terminal of claim 1, wherein the indicia reading terminal is operable to attempt to decode the decodable indicia represented in the first rendered image by automatically discriminating from a plurality of different decodable indicia having different symbologies.

8. The indicia reading terminal of claim 1, wherein the indicia reading terminal is operable to attempt to decode the decodable indicia represented in the plenoptic image data without rendering.

9. The indicia reading terminal of claim 1, wherein the indicia reading terminal is operable to obtain a first rendered image based on at least a portion of the second plenoptic image data by obtaining a rendered image corresponding to a portion of the plenoptic image data corresponding to a center portion of the plenoptic image projected onto the image sensor array and/or a portion of the plenoptic image data corresponding to an elongated center portion of the plenoptic image projected onto and across the image sensor array.

10. The indicia reading terminal of claim 1, wherein the indicia reading terminal is operable to determine at least one physical dimension of an object attached to the decodable indicia based on at least one rendered image.

11. The indicia reading terminal of claim 1, wherein the indicia reading terminal is operable to:
    project a third plenoptic image of a space containing a first object onto the image sensor array;
    obtain third plenoptic image data of the first object from the image sensor array;
    project a fourth plenoptic image of a space containing a second object onto the image sensor array;
    obtain fourth plenoptic image data of the second object from the image sensor array; and
    compare the first object and the second object for correlation.

12. A method for decoding decodable indicia, comprising:
    obtaining a first plenoptic image data corresponding to a space containing a decodable indicia from an image sensor array of an indicia reading terminal;
    adjusting at least one operating parameter of the indicia reading terminal based on the first plenoptic image data, wherein the at least one operating parameter comprises:
        an exposure period of the image sensor array;
        operation of the illumination subsystem for projecting illumination onto the decodable indicia;
        an exposure period of the image sensor array and operation of the illumination subsystem for projecting illumination onto the decodable indicia;
        a gain of the plenoptic image signals read out of the image sensor array; and/or
    a frame rate at which the indicia reading terminal captures frames of image data;
    obtaining a second plenoptic image data corresponding to the space containing the decodable indicia from the image sensor array of the indicia reading terminal;
    obtaining a first rendered image based on at least a portion of the second plenoptic image data; and
    attempting a decode of the decodable indicia represented in the first rendered image.

13. The method of claim 12, comprising, if the attempted decode is not successful:
    obtaining a second rendered image based on the second plenoptic image data; and
    attempting another decode of the decodable indicia represented in the second rendered image.

14. The method of claim 12, comprising determining at least one physical dimension of an object attached to the decodable indicia based on at least one rendered image.

15. The method of claim 12, comprising:
    projecting a third plenoptic image of a space containing a first object onto the image sensor array;
    obtaining third plenoptic image data of the first object from the image sensor array;
    projecting a fourth plenoptic image of a space containing a second object onto the image sensor array;
    obtaining fourth plenoptic image data of the second object from the image sensor array; and
    comparing the first object and the second object for correlation.

16. A terminal for measuring a dimension of an object, the terminal comprising:
    a multi-core processor; and
    a plenoptic imaging subsystem comprising an image sensor array and plenoptic imaging optics operable to project a plenoptic image of a space onto the image sensor array;
    wherein the terminal is operable to:
        obtain plenoptic image data of the object from said image sensor array; and
        attempt to determine a height, a width, and/or a depth dimension of the object based on at least a portion of the plenoptic image data using different portions of the plenoptic image data processed by the multi-core processor.

17. The terminal of claim 16, wherein the terminal is operable to:
    obtain a rendered image from the plenoptic image data; and
    attempt to determine a height, a width, and/or a depth dimension of the object based on the rendered image.

18. The terminal of claim 16, wherein the terminal is operable to:
    determine a distance from the terminal to the object from the plenoptic image data; and
    attempt to determine a height, a width, and/or a depth dimension of the object based on the determined distance from the terminal to the object.

19. The terminal of claim 16, wherein the plenoptic imaging optics comprises a mask.

20. The terminal of claim 16, wherein the terminal is operable to determine the height, the width, and the depth dimensions of the object based on operation of the terminal directed from a single direction relative to the object.

* * * * *